US012507416B2

(12) United States Patent
Kwon et al.

(10) Patent No.: US 12,507,416 B2
(45) Date of Patent: Dec. 23, 2025

(54) MEMORY DEVICE INCLUDING MEMORY BLOCKS DIFFERENT FROM EACH OTHER

(71) Applicant: Samsung Electronics Co., Ltd., Suwon-si (KR)

(72) Inventors: Hyukje Kwon, Seoul (KR); Byungyong Choi, Seongnam-si (KR); Jisang Lee, Iksan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1103 days.

(21) Appl. No.: 17/350,760

(22) Filed: Jun. 17, 2021

(65) Prior Publication Data

US 2022/0130849 A1    Apr. 28, 2022

(30) Foreign Application Priority Data

Oct. 22, 2020  (KR) .................. 10-2020-0137451

(51) Int. Cl.
*H10B 43/40* (2023.01)
*G11C 16/04* (2006.01)
*G11C 16/08* (2006.01)
*G11C 16/24* (2006.01)
*H10B 41/27* (2023.01)
*H10B 41/41* (2023.01)
*H10B 43/27* (2023.01)

(52) U.S. Cl.
CPC .......... *H10B 43/40* (2023.02); *G11C 16/0483* (2013.01); *G11C 16/08* (2013.01);
(Continued)

(58) Field of Classification Search
CPC ........ H10B 43/40; H10B 41/27; H10B 41/41; H10B 43/27; H10B 41/35; H10B 43/35;
(Continued)

(56) References Cited

U.S. PATENT DOCUMENTS 5,847,995 A    12/1998   Kobayashi et al.
5,963,475 A *  10/1999   Choi ................... G11C 16/34
                                                 365/185.11
(Continued)

FOREIGN PATENT DOCUMENTS

KR   10-2010-0076692 A    7/2010
KR     1020120075882 A    7/2012
(Continued)

OTHER PUBLICATIONS

European Search Report Feb. 21, 2022 for corresponding application EP 21193946.7.

*Primary Examiner* — Davienne N Monbleau
*Assistant Examiner* — John Patrick Cornely
(74) *Attorney, Agent, or Firm* — Muir Patent Law, PLLC

(57) ABSTRACT

A memory device includes a cell region in which memory blocks, respectively including gate electrodes and insulating layers, alternately stacked on a substrate, and channel structures, extending in a first direction, perpendicular to an upper surface of the substrate, passing through the gate electrodes and the insulating layers, and connected to the substrate, are arranged. A peripheral circuit region includes a row decoder connected to the gate electrodes and a page buffer connected to the channel structures. The memory blocks include main blocks and at least one spare block, wherein a length of the spare block is shorter than a length of each of the main blocks, in a second direction, parallel to the upper surface of the substrate.

18 Claims, 32 Drawing Sheets

(52) U.S. Cl.
CPC ............. *G11C 16/24* (2013.01); *H10B 41/27* (2023.02); *H10B 41/41* (2023.02); *H10B 43/27* (2023.02)

(58) Field of Classification Search
CPC ..... G11C 16/0483; G11C 16/08; G11C 16/24; G11C 7/1057; G11C 8/10; G11C 16/26; G11C 29/802; G11C 29/804; G11C 29/835; G11C 2029/4402; G11C 5/025; G11C 5/063; G11C 29/82; G11C 16/10; H01L 27/0207
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| RE47,816 E | 1/2020 | Rhie | |
| 2009/0150599 A1 | 6/2009 | Bennett | |
| 2009/0222643 A1 | 9/2009 | Chu | |
| 2010/0293323 A1 | 11/2010 | Jeon et al. | |
| 2011/0205796 A1 | 8/2011 | Kim | |
| 2011/0233648 A1 | 9/2011 | Seol et al. | |
| 2019/0115361 A1 | 4/2019 | Kim et al. | |
| 2019/0164991 A1 | 5/2019 | Lim et al. | |
| 2019/0221267 A1 | 7/2019 | Ko et al. | |
| 2019/0286556 A1 | 9/2019 | You | |
| 2019/0295602 A1 | 9/2019 | Kim et al. | |
| 2019/0348129 A1* | 11/2019 | Chin | G11C 8/12 |
| 2019/0362792 A1 | 11/2019 | Oh et al. | |
| 2020/0133574 A1 | 4/2020 | Lee et al. | |

FOREIGN PATENT DOCUMENTS

| | | |
|---|---|---|
| KR | 10-1494333 B1 | 2/2015 |
| KR | 10-2019-0107963 A | 9/2019 |

* cited by examiner

V-V'

MEMORY DEVICE INCLUDING MEMORY
BLOCKS DIFFERENT FROM EACH OTHER

CROSS-REFERENCE TO RELATED
APPLICATION(S)

This application claims the benefit of priority to Korean Patent Application No. 10-2020-0137451 filed on Oct. 22, 2020 in the Korean Intellectual Property Office, the disclosure of which is incorporated herein by reference in its entirety.

BACKGROUND

The present inventive concept relates to a memory device.

A memory device may include a cell region in which memory cells for writing data are disposed, and a peripheral circuit region in which circuits controlling the cell region are disposed, and the cell region and the peripheral circuit region may be divided into a plurality of blocks. The plurality of blocks may include main blocks storing data or outputting the stored data, and at least one spare block storing data important for operations of the memory device.

SUMMARY

An aspect of the present inventive concept is to provide a memory device having an improved degree of integration by forming a spare block having a smaller area than a main block.

According to an aspect of the present inventive concept, a memory device includes a cell region in which memory blocks are disposed, each of the memory blocks including gate electrode layers and insulating layers, alternately stacked on a substrate, and channel structures extending in a first direction perpendicular to an upper surface of the substrate and passing through the gate electrode layers and the insulating layers to be connected to the substrate; and a peripheral circuit region including a row decoder connected to the gate electrode layers and a page buffer connected to the channel structures. The memory blocks include main blocks and at least a first spare block. A length of the first spare block is shorter than a length of each of the main blocks, in a second direction parallel to the upper surface of the substrate.

According to an aspect of the present inventive concept, a memory device includes a memory cell array including a plurality of memory cells and divided into a plurality of blocks; a row decoder connected to the memory cell array through word lines; a page buffer connected to the memory cell array through bit lines; and a control logic circuit configured to control the memory cell array through the row decoder and the page buffer. The memory cell array, the row decoder, and the page buffer are provided in a plurality of planes including a first plane and a second plane, wherein each of the memory cell array of the first plane and the memory cell array of the second plane includes main blocks and at least a first spare block, respectively. The number of memory cells included in the spare block is less than the number of memory cells included in each of the main blocks.

According to an aspect of the present inventive concept, a memory device includes a cell region in which a plurality of memory blocks are disposed, each of the memory blocks including gate electrode layers and insulating layers alternately stacked on a substrate, and channel structures extending in a first direction perpendicular to an upper surface of the substrate, and passing through the gate electrode layers and the insulating layers to be connected to the substrate; and a peripheral circuit region including a row decoder connected to the gate electrode layers and a page buffer connected to the channel structures. The gate electrode layers in each of the memory blocks provide at least one ground selection line, a plurality of word lines, and a plurality of string selection lines, wherein the string selection lines are separated from each other in a second direction, intersecting the first direction and parallel to the upper surface of the substrate. The numbers of the string selection lines included in each memory block of a first group of the memory blocks are different from the number of the string selection lines included in each memory block of a second group of the memory blocks.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
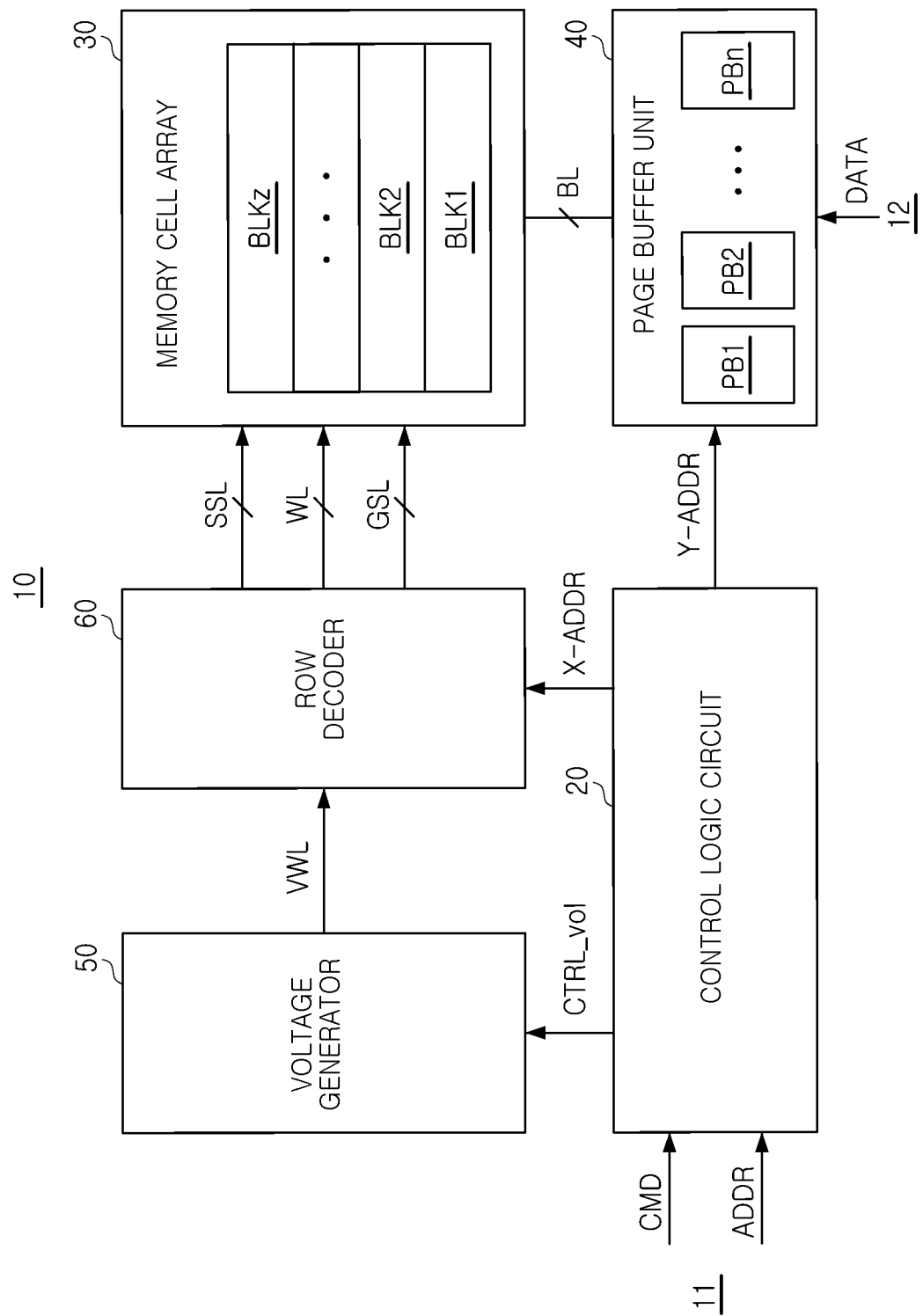
FIG. 1 is a block diagram schematically illustrating a memory device according to an embodiment of the present inventive concept.

FIG. 1 is a block diagram schematically illustrating a memory device according to an embodiment of the present inventive concept.

Referring to FIG. 1, a memory device 10 may include a control logic circuit 20, a memory cell array 30, a page buffer unit 40, a voltage generator 50, and a row decoder 60. The memory device 10 may further include interface circuits 11 and 12, and may further include a column logic, a pre-decoder, a temperature sensor, a command decoder, an address decoder, and a source driver. The memory device may be in the form, for example, of a semiconductor chip, formed on a die from a semiconductor wafer; a semiconductor package, including one or more semiconductor chips formed on a package substrate, stacked vertically and/or arranged horizontally on the package substrate, and covered with an encapsulant or mold layer; or a memory module including a plurality of semiconductor chips or semiconductor packages arranged horizontally on board such as a printed circuit board (PCB).

The control logic circuit 20 may generally control various operations within the memory device 10. The control logic circuit 20 may output various control signals in response to a command CMD and/or an address ADDR from the interface circuit 11. For example, the control logic circuit 20 may output a voltage control signal CTRL_vol, a row address X-ADDR, and a column address Y-ADDR.

The memory cell array 30 may include a plurality of memory blocks BLK1 to BLKz (where z is a positive integer), and each of the plurality of memory blocks BLK1 to BLKz may include a plurality of memory cells. For example, the plurality of memory blocks BLK1 to BLKz may include main blocks storing data, and at least one spare block storing data used for an operation of the memory device 10. The memory cell array 30 may be connected to the page buffer unit 40 through bit lines BL, and may be connected to the row decoder 60 through word lines WL, string selection lines SSL, and ground selection lines GSL.

In an embodiment, the memory cell array 30 may include a 3D memory cell array, and the 3D memory cell array may include a plurality of NAND strings. Each of the NAND strings may include memory cells respectively connected to word lines stacked vertically on a substrate. U.S. Pat. Nos. 7,679,133, 8,553,466, 8,654,587, 8,559,235, and U.S. Patent Application Publication No. 2011/0233648, describe aspects of 3D memory cell arrays, and are incorporated herein by reference in their entirety. In an embodiment, the memory cell array 30 may include a 2D memory cell array, and the 2D memory cell array may include a plurality of NAND strings, arranged in row and column directions.

The page buffer unit 40, also described as a page buffer circuit, may include a plurality of page buffers PB1 to PBn (where n is an integer of 3 or more), and the page buffers PB1 to PBn may be connected to the memory cells through a plurality of bit lines BL. The page buffer unit 40 may select at least one bit line among the bit lines BL in response to the column address Y-ADDR. The page buffer unit 40 may operate as a write driver or a sense amplifier according to an operation mode. For example, during a programming operation, the page buffer unit 40 may apply a bit line voltage, corresponding to data to be programmed, to the selected bit line. During a read operation, the page buffer unit 40 may sense a current or a voltage of the selected bit line to sense data stored in the memory cell. The data to be programmed by the programming operation and the data read by the read operation may be input/output through the interface circuit 12.

The voltage generator 50 may generate various types of voltages for performing a programming operation, a read operation, and an erase operation, based on the voltage control signal CTRL_vol. For example, the voltage generator 50 may generate a program voltage, a read voltage, a pass voltage, a program verification voltage, an erase voltage, and the like. In an embodiment, the control logic circuit 20 may control the voltage generator 50 to generate a voltage for executing the program, read, and erase operations using data stored in the spare block. A portion of the voltages generated by the voltage generator 50 may be input to the word lines WL by the row decoder 60 as a word line voltage VWL, and a portion thereof may be input to a common source line by a source driver.

The row decoder 60 may select one word line among the plurality of word lines WL in response to the row address X-ADDR, and may select one string selection line among the plurality of string selection lines SSL. For example, during the programming operation, the row decoder 60 may apply the program voltage and the program verification voltage to the selected word line, and may apply the read voltage to the selected word line during the read operation.

Figure 2:
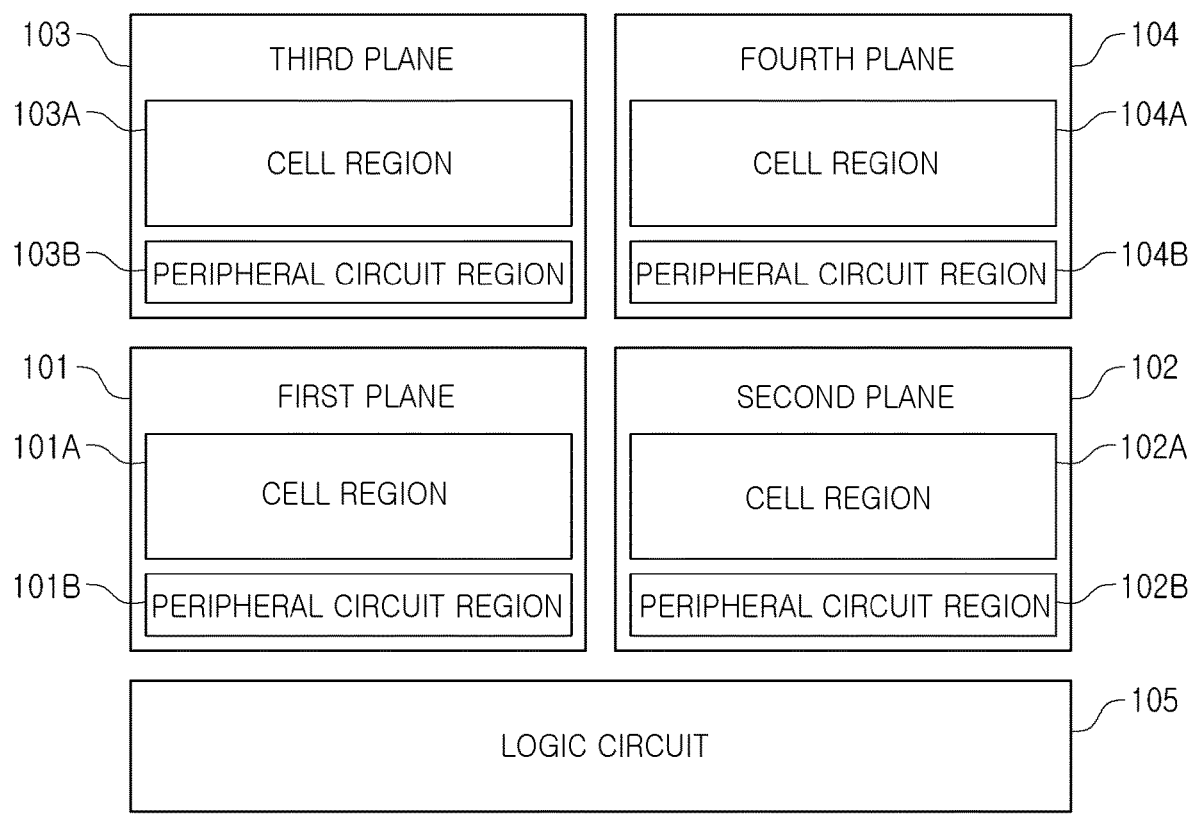
FIG. 2 is a view illustrating a schematic configuration of a memory device according to an embodiment of the present inventive concept.

FIG. 2 is a view illustrating a schematic configuration of a memory device according to an embodiment of the present inventive concept.

Referring to FIG. 2, a memory device 100 according to an embodiment of the present inventive concept may include a plurality of planes 101 to 104 and a logic circuit 105. For example, each of the plurality of planes 101 to 104 may include a memory cell array 30, a page buffer unit 40, a row decoder 60, and the like, and the logic circuit 105 may include a control logic circuit 20 and a voltage generator 50, as described with reference to FIG. 1.

According to embodiments, each of the plurality of planes 101 to 104 may operate independently of each other. For example, while a first plane 101 executes a programming operation that records (e.g., writes) data received from an external memory controller, the logic circuit 105 may read data stored in a second plane 102 and may output the data externally.

Each of the plurality of planes 101 to 104 may include a cell region and a peripheral circuit region. The cell region may include memory cells, and the peripheral circuit region may include circuits controlling the cell region, for example, a row decoder and a page buffer unit.

In an embodiment, the cell region of each of the plurality of planes 101 to 104 may include a plurality of blocks. As described above, the plurality of blocks may include main blocks storing data and outputting data in response to a command from the logic circuit 105, and a spare block storing data used for an operation of the memory device 100. In an embodiment, only some of the plurality of planes 101 to 104 include the spare block. Each single plane may include a plurality of blocks including one or more main blocks and optionally one or more spare blocks. For example, the first plane 101 and the second plane 102 may include the spare block, and the third plane 103 and the fourth plane 104 do not include the spare block and may include only the main blocks. When data used for the operation of the memory device 100 is stored in the spare block of the first plane 101, the spare block of the second plane 102 may be used as a spare. Alternatively, only the first plane 101 may include the spare block, and the remaining planes 102 to 104 may not include the spare block.

In general, data stored in the spare block does not have a high capacitance, and entire capacitance supported by one (1) spare block may not be used. For example, a portion of the memory cells included in the spare block may be allocated as active memory cells and the rest may be allocated as non-active memory cells, and the logic circuit 105 may write data to only the active memory cells for the spare block. The number of active memory cells in the spare block may be less than the number of non-active memory cells in the spare block. Therefore, when the spare block is implemented in the same area as each of the main blocks, the degree of integration of the memory device 100 may be reduced.

In an embodiment of the present inventive concept, an area of the spare block is smaller than an area of each of the main blocks. Therefore, a space secured by reducing the area of the spare block may be used as a space for the main blocks, and a degree of overall integration of the memory device 100 may be improved.

Figure 3:
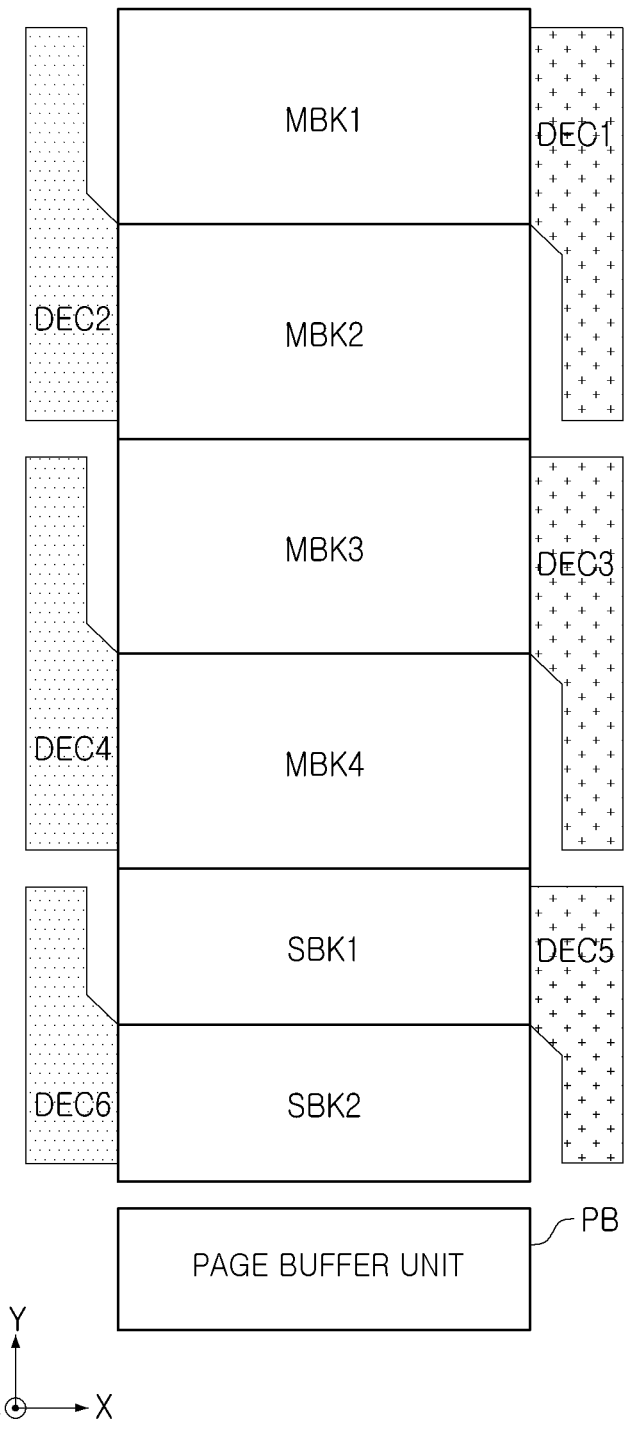
FIGS. 3 and 4 are views schematically illustrating a configuration of planes included in a memory device according to an embodiment of the present inventive concept.
Figure 4:
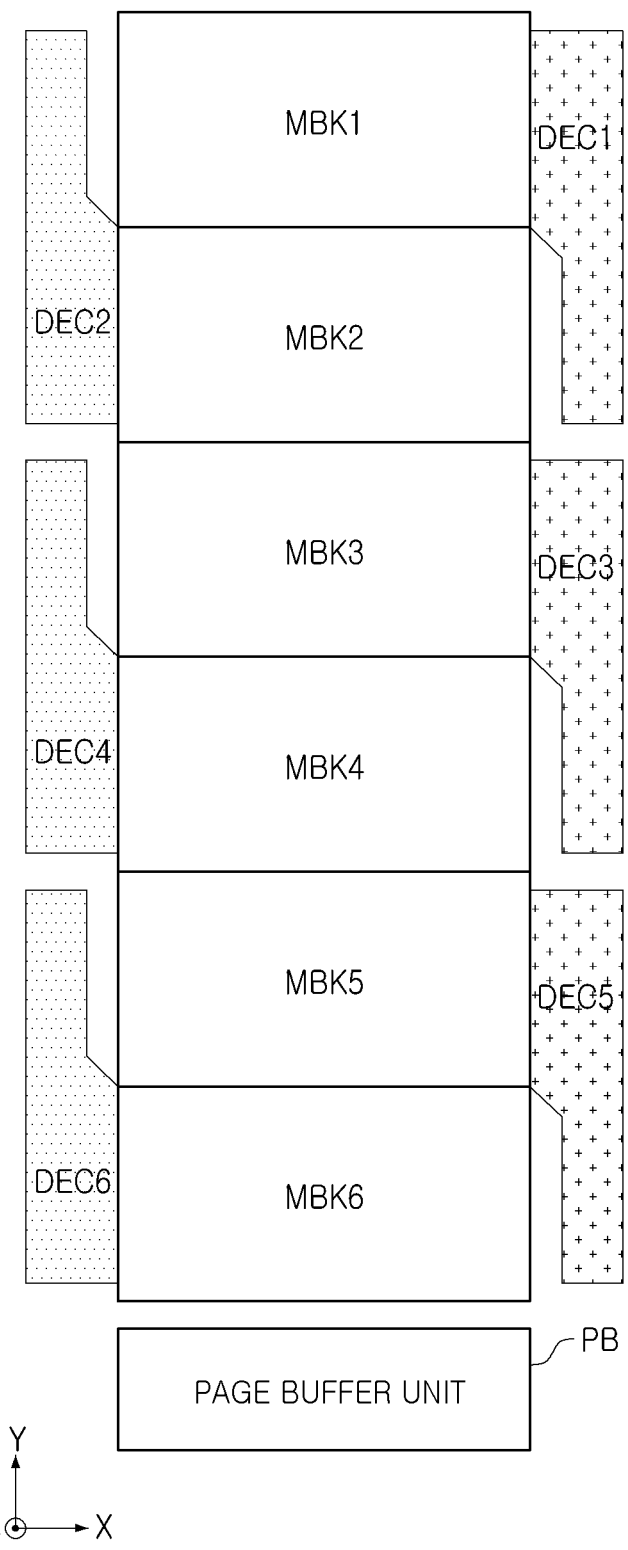

FIGS. 3 and 4 are views schematically illustrating a configuration of planes included in a memory device according to an embodiment of the present inventive concept.

First, in one embodiment, FIG. 3 is a view illustrating a configuration of the first plane 101 of the memory device 100 according to the embodiment illustrated in FIG. 2. Referring to FIG. 3, the first plane 101 may include main blocks MBK1 to MBK4 and spare blocks SBK1 and SBK2. An arrangement and the number of the main blocks MBK1 to MBK4 and the spare blocks SBK1 and SBK2 may be variously modified according to embodiments. Each of the main blocks MBK1 to MBK4 and the spare blocks SBK1 and SBK2 may include a plurality of gate electrode layers stacked in a first direction (a Z-axis direction) and a plurality of channel structures, extending in the first direction. Components described herein as "extending" in a particular direction, unless the context indicates otherwise, extend lengthwise in that direction, such that the length of the component in that direction is greater than a length or width of the component in a direction perpendicular to the stated extending direction.

The main blocks MBK1 to MBK4 and the spare blocks SBK1 and SBK2 may be arranged in a second direction (a Y-axis direction). In each of the main blocks MBK1 to MBK4 and the spare blocks SBK1 and SBK2, the gate electrode layers may extend in a third direction (an X-axis direction), and may be connected to row decoders DEC1 to DEC6 in the third direction. For example, the gate electrode layers included in a first main block MBK1 may be connected to a first row decoder DEC1 disposed on a right side in the third direction. The gate electrode layers included in a second main block MBK2 may be connected to a second row decoder DEC2 disposed on a left side in the third direction.

A page buffer unit PB may be disposed on one side of the main blocks MBK1 to MBK4 and the spare blocks SBK1 and SBK2 in the second direction. The page buffer unit PB may be connected to the channel structures disposed in the main blocks MBK1 to MBK4 and the spare blocks SBK1 and SBK2, through bit lines extending in the second direction. For example, the page buffer unit PB may include a plurality of page buffers, and each of the page buffers may be connected to one or more channel structures through a bit line.

Referring to FIG. 3, in the second direction, a length of each of the spare blocks SBK1 and SBK2 may be shorter than a length of each of the main blocks MBK1 to MBK4. According to embodiments, in the third direction, a length of each of the spare blocks SBK1 and SBK2 may be shorter than a length of each of the main blocks MBK1 to MBK4. An area occupied by each of the spare blocks SBK1 and SBK2 may be smaller than an area occupied by each of the main blocks MBK1 to MBK4. In addition to MBK1 to MBK4, other main blocks may be additionally disposed, or peripheral circuits such as the page buffer unit PB may be disposed, in a space reserved by reducing the area of the spare blocks SBK1 and SBK2, to improve a degree of integration of the memory device 100. As the area of each of the spare blocks SBK1 and SBK2 decreases, an area of a region in which fifth and sixth row decoders DEC5 and DEC6 connected to each of the spare blocks SBK1 and SBK2 are disposed may be smaller than an area of a region in which the first to fourth row decoders DEC1 to DEC4 connected to the main blocks MBK1 to MBK4 are disposed. Therefore, an area occupied by each of the fifth and sixth row decoders DEC5 and DEC6 connected to each of the respective spare blocks SBK1 and SBK2 may be less than an area occupied by each of the first to fourth row decoders DEC1 to DEC4 connected to each of the respective main blocks MBK1 to MBK4. An area occupied by a particular block may include an area formed by outer boundaries of the memory cell array connected to the row decoder and page buffer unit for that block, for example. An area occupied by a particular row decoder may include an area formed by outer boundaries of the circuit elements of that row decoder that perform decoding for a particular corresponding memory block.

FIG. 4 is a view illustrating a configuration of the second plane 102 of the memory device 100 according to the embodiment illustrated in FIG. 2. Referring to FIG. 4, the second plane 102 may include only main blocks MBK1 to MBK6 without a spare block. An arrangement of the main blocks MBK1 to MBK6, the row decoders DEC1 to DEC6, and the page buffer unit PB may be similar to the main blocks of the first plane 101 described with reference to FIG. 3.

FIGS. 5 to 9 are views schematically illustrating blocks included in a memory device according to an embodiment of the present inventive concept.

Figure 5:
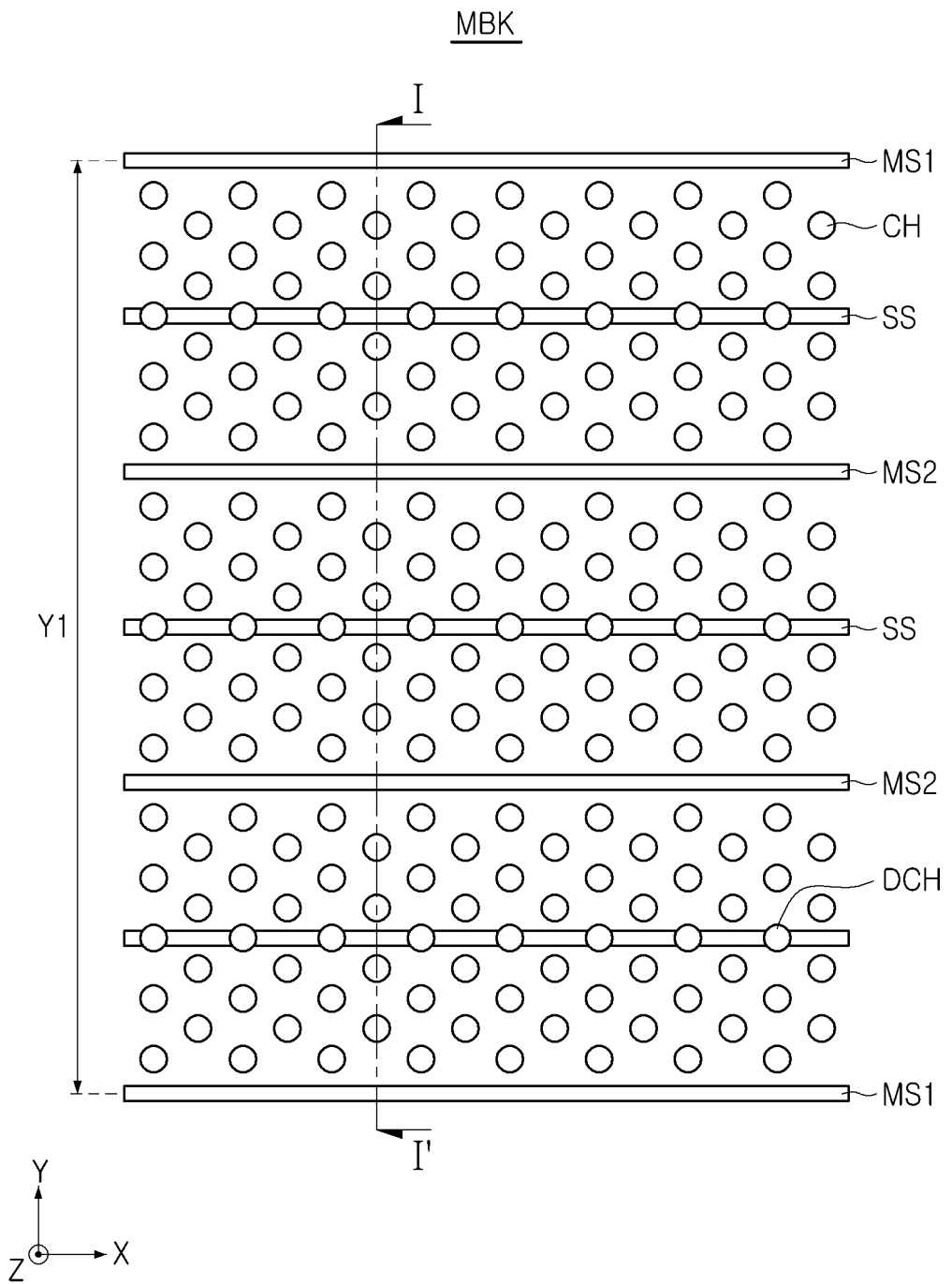
FIGS. 5 to 9 are views schematically illustrating blocks included in a memory device according to an embodiment of the present inventive concept.
Figure 6:
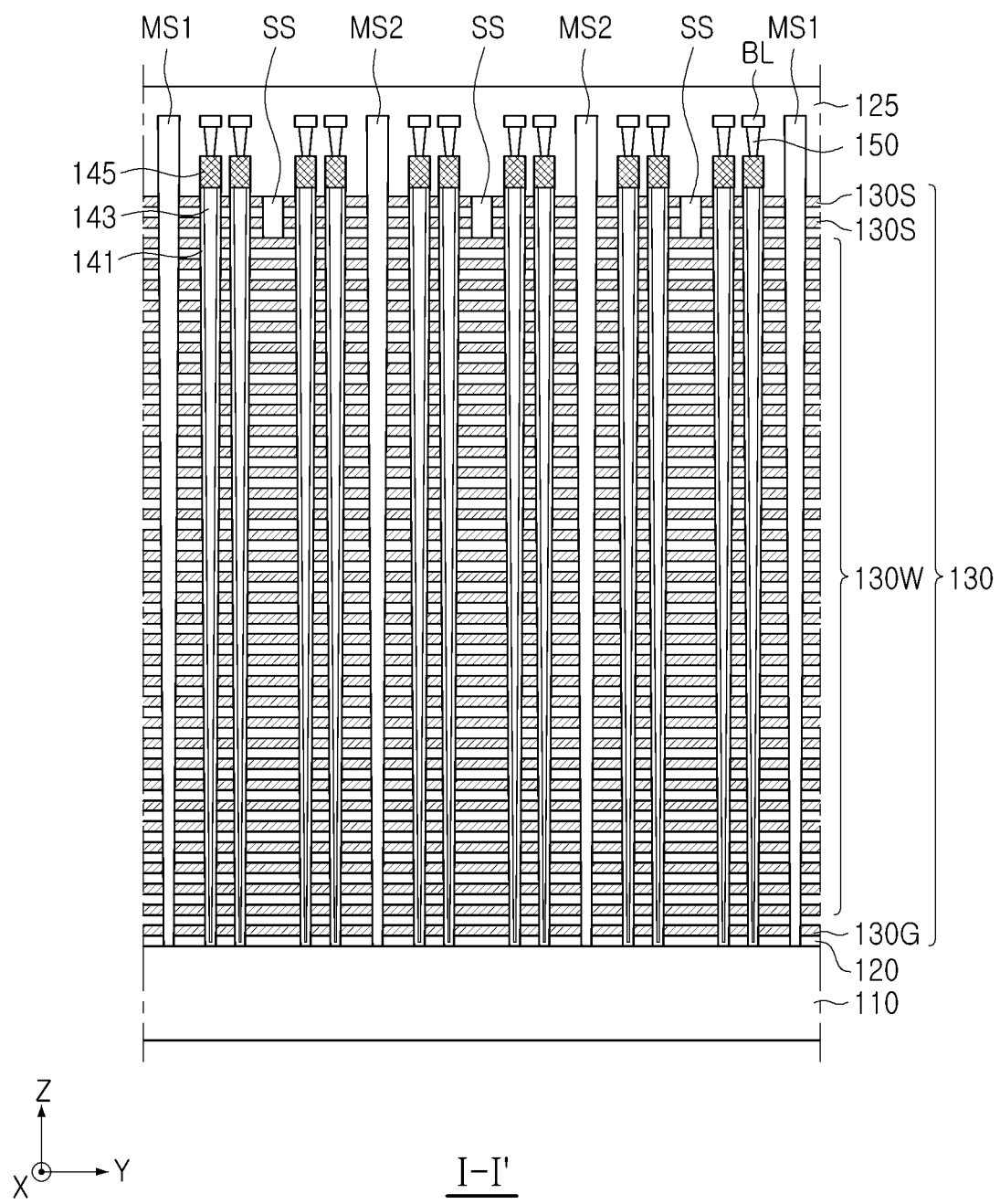

First, FIGS. 5 and 6 are views illustrating regions of a main block MBK, disposed adjacent to each other, in a memory device according to an embodiment of the present inventive concept. FIG. 6 is a cross-sectional view illustrating FIG. 5, taken along line I-I'.

Referring to FIGS. 5 and 6, a main block MBK may include a plurality of insulating layers 120 and a plurality of gate electrode layers 130, alternately stacked on a substrate 110, channel structures CH extending in the first direction (the Z-axis direction), perpendicular to an upper surface of the substrate 110, and the like. An interlayer insulating layer 125 may be formed on the insulating layers 120 and the gate electrode layers 130.

The channel structures CH pass through the insulating layers 120 and the gate electrode layers 130, extend to the substrate 110, and include a channel layer 141, a buried insulating layer 143, a bit line connection layer 145, and the like. The substrate 110 and the channel layer 141 may be formed of a semiconductor material, and may be doped with impurities according to embodiments. The channel structures CH may be connected to bit lines BL through bit line contacts 150 thereon.

The insulating layers 120 and the gate electrode layers 130 may be divided into a plurality of regions in the second direction (the Y-axis direction) by a plurality of separation layers MS1 and MS2. For example, first separation layers MS1 may be separation layers defining the main block MBK, and may extend in the third direction (the X-axis direction). Second separation layers MS2 may be disposed between the first separation layers MS1. For example, the first separation layers MS1 may extend in the third direction to define a boundary of the main block MBK, and the second separation layers MS2 may be formed between the first separation layers MS1 and may extend to be shorter than the first separation layers MS1. When a length of the second separation layers MS2 is shorter than a length of the first separation layers MS1, at least a portion of the gate electrode layers 130 may be provided as a single continuous layer in the Y-axis direction, between the first separation layers MS1. The first separation layers MS1 and the second separation layers MS2 may at least extend to the upper surface of the substrate 110.

The gate electrode layers 130 may include a lower gate electrode layer 130G providing a ground selection line, memory gate electrode layers 130W providing word lines connected to memory cells, and upper gate electrode layers 130S providing a string selection line. The number of the lower gate electrode layer 130G and the upper gate electrode layers 130S may vary according to embodiments, and the number of memory gate electrode layers 130W may also vary according to the embodiment. According to embodiments, at least one of the memory gate electrode layers 130W may provide a dummy word line. In addition, a gate electrode layer disposed adjacent to the lower gate electrode layer 130G and/or the upper gate electrode layer 130S may provide an erase control line connected to an erase transistor used for an erase operation, based on a gate induced drain leakage phenomenon.

Referring to FIGS. 5 and 6, the main block MBK may include dummy channel structures DCH. The dummy channel structures DCH may not be connected to the bit lines BL, and for example, may be disposed along upper separation layers SS. Thus, in some embodiments, the dummy channel structures DCH do not form memory cells to which data can be read from or written to. The upper separation layers SS may divide the upper gate electrode layers 130S providing the string selection line into a plurality of regions in the second direction. In the embodiment illustrated in FIGS. 5 and 6, the main block MBK may be defined as including six (6) string selection lines, separated from each other in the second direction by the second separation layers MS2 and the upper separation layers SS. In the second direction, the main block MBK may have a first length Y1.

Figure 7:
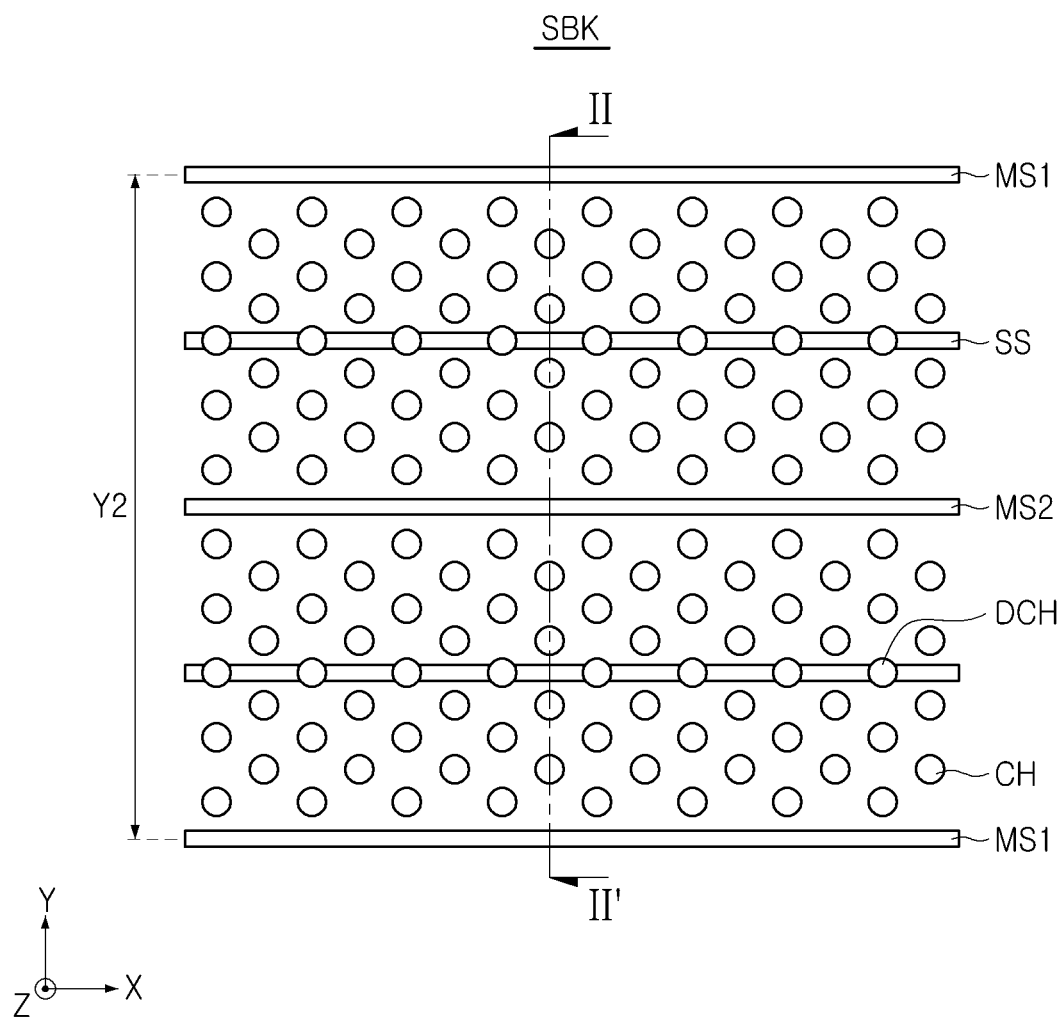
Figure 8:
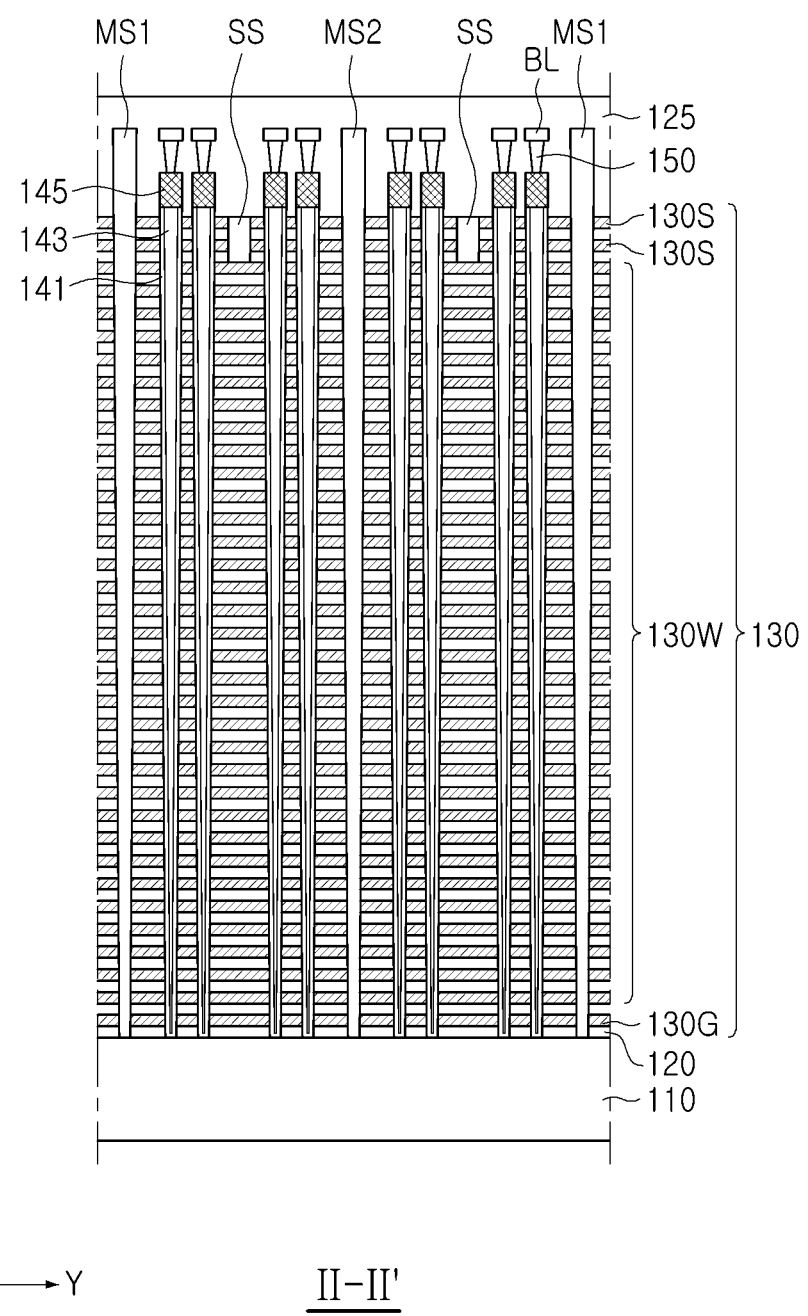

FIGS. 7 and 8 are views illustrating regions of a spare block SBK, disposed adjacent to each other, in a memory device according to an embodiment of the present inventive concept. FIG. 8 is a cross-sectional view illustrating FIG. 7, taken along line II-II'.

Referring to FIGS. 7 and 8, a spare block SBK may have a structure similar to the main block MBK described above with reference to FIGS. 5 and 6. For example, the spare block SBK may include a plurality of insulating layers 120 and a plurality of gate electrode layers 130, alternately stacked on a substrate 110, channel structures CH extending in the first direction, and the like. An interlayer insulating layer 125 may be formed on the insulating layers 120 and the gate electrode layers 130, and the gate electrode layers 130 may be divided into a plurality of regions in the second direction by separation layers MS1 and MS2.

A pair of first separation layers MS1 may define a boundary of the spare block SBK, and a second separation layer MS2 may be disposed between the first separation layers MS1. As described above with reference to FIGS. 5 and 6, in the third direction, each of the first separation layers MS1 may extend to be longer than the second separation layer MS2.

Upper separation layers SS may be disposed between each of the first separation layers MS1 and the second separation layer MS2. The upper separation layers SS divide upper gate electrode layers 130S providing a string selection line, among the gate electrode layers 130, into a plurality of regions in the second direction. Therefore, the spare block SBK may be defined as including four (4) string selection lines, separated from each other in the second direction by the second separation layer MS2 and the upper separation layers SS, and in the second direction. The spare block SBK may have a second length Y2, shorter than the first length Y1.

In an embodiment of the present inventive concept, the number of string selection lines included in the spare block SBK may be N (where N is a natural number of 2 or more), and the number of string selection lines included in the main block MBK may be M (where M is a natural number greater than N). Each string selection line (e.g., extending between a second separation layer MS2 and upper separation layer SS) in the main block MBK may have a length in the second direction the same as a length in the second direction of the string selection lines in the spare blocks SBK. However, because the number of string selection lines included in the spare block SBK is smaller than the number of string selection lines included in the main blocks MBK, the spare block SBK may have a shorter length than the main block MBK in the second direction, and the main block MBK and/or peripheral circuits may be arranged in an extra space reserved by reducing a space occupied by the spare block SBK, to improve a degree of integration of the memory device. The main blocks MBK may be described as a first group of memory blocks, and the spare block SBK (or a plurality of spare blocks) may be described as a second group of memory blocks.

Figure 9:
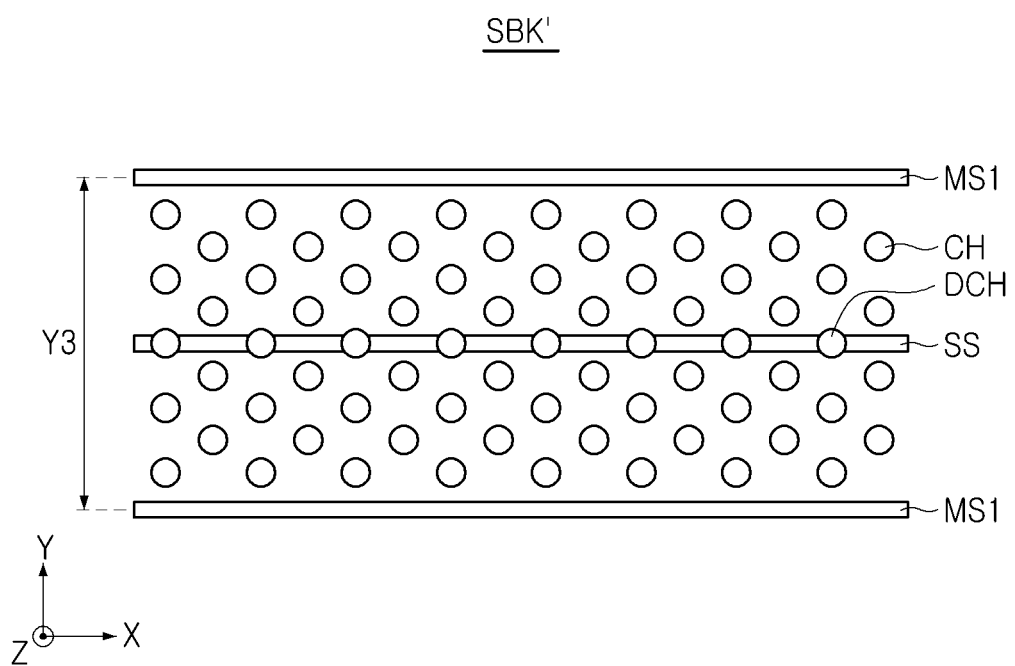

Referring to FIG. 9, a spare block SBK' may include two (2) string selection lines separated from each other in the second direction. Therefore, the spare block SBK' according to the embodiment illustrated in FIG. 9 may have a third length Y3, shorter than the first length Y1 and the second length Y2 in the second direction. According to embodiments, at least one of planes included in a memory device may include all of the spare blocks SBK and SBK' having different lengths in the second direction.

Figure 10:
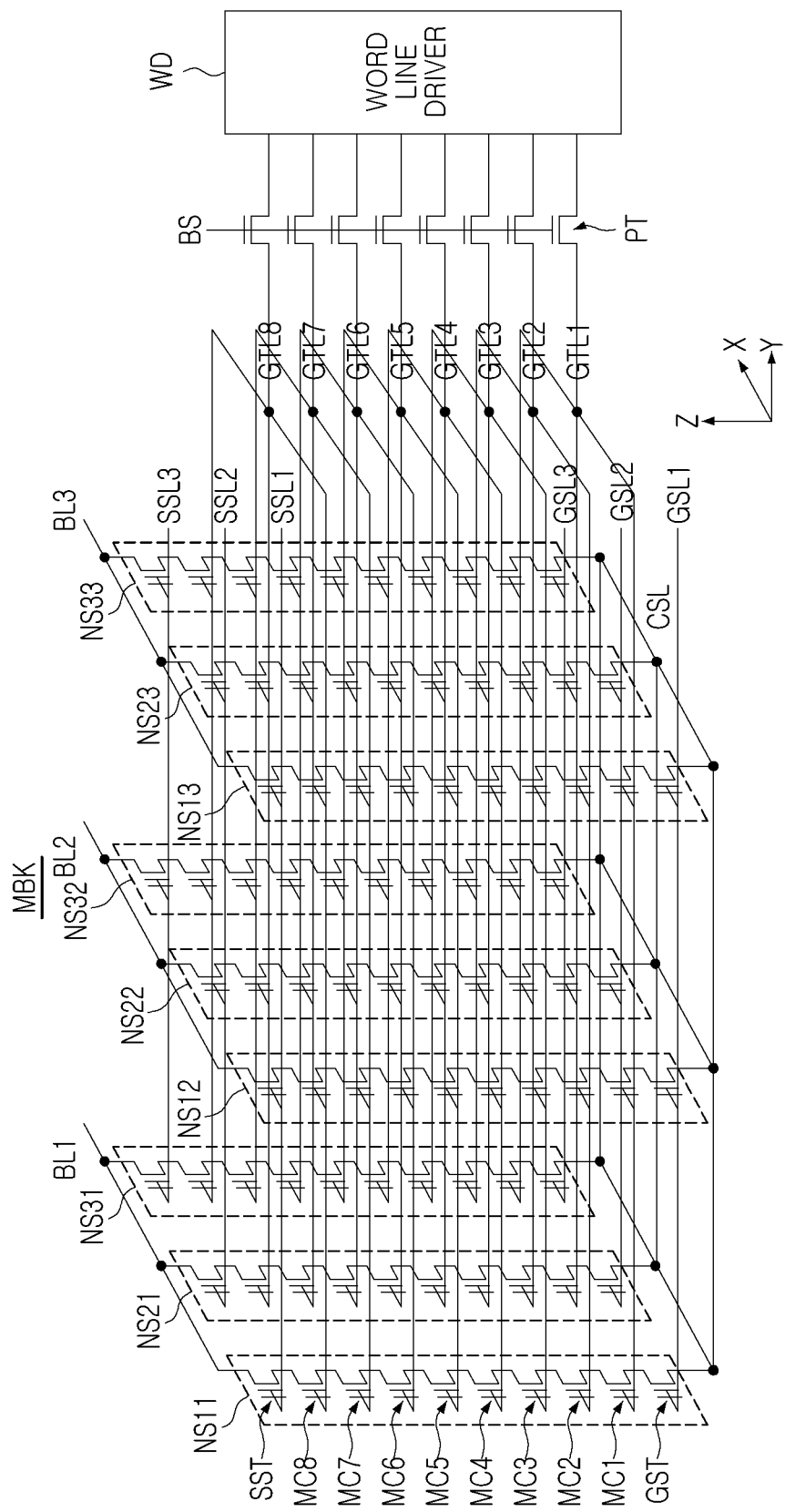
FIGS. 10, 11A, and 11B are circuit diagrams schematically illustrating blocks included in a memory device according to an embodiment of the present inventive concept.
Figure 11A:
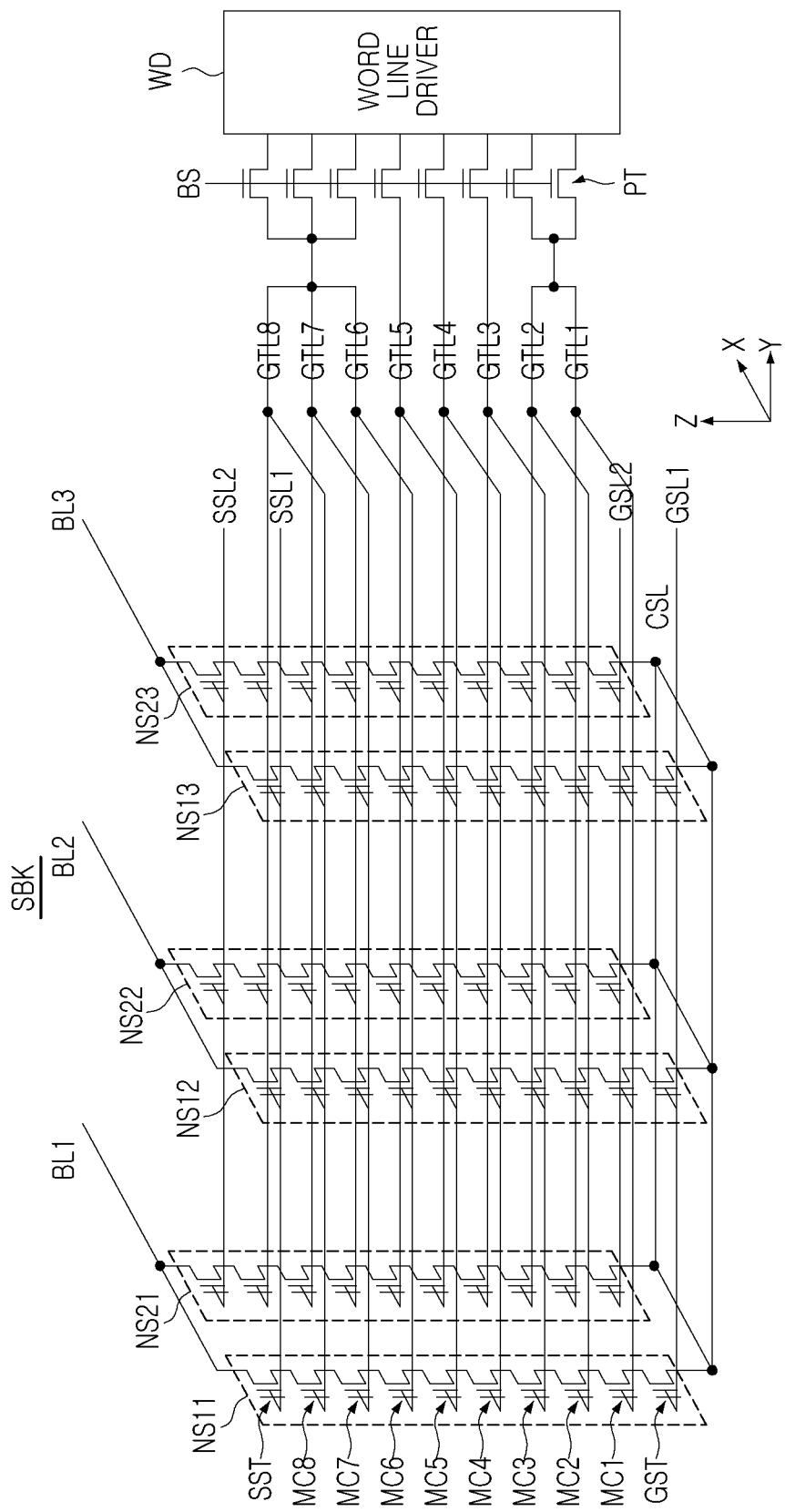
Figure 11B:
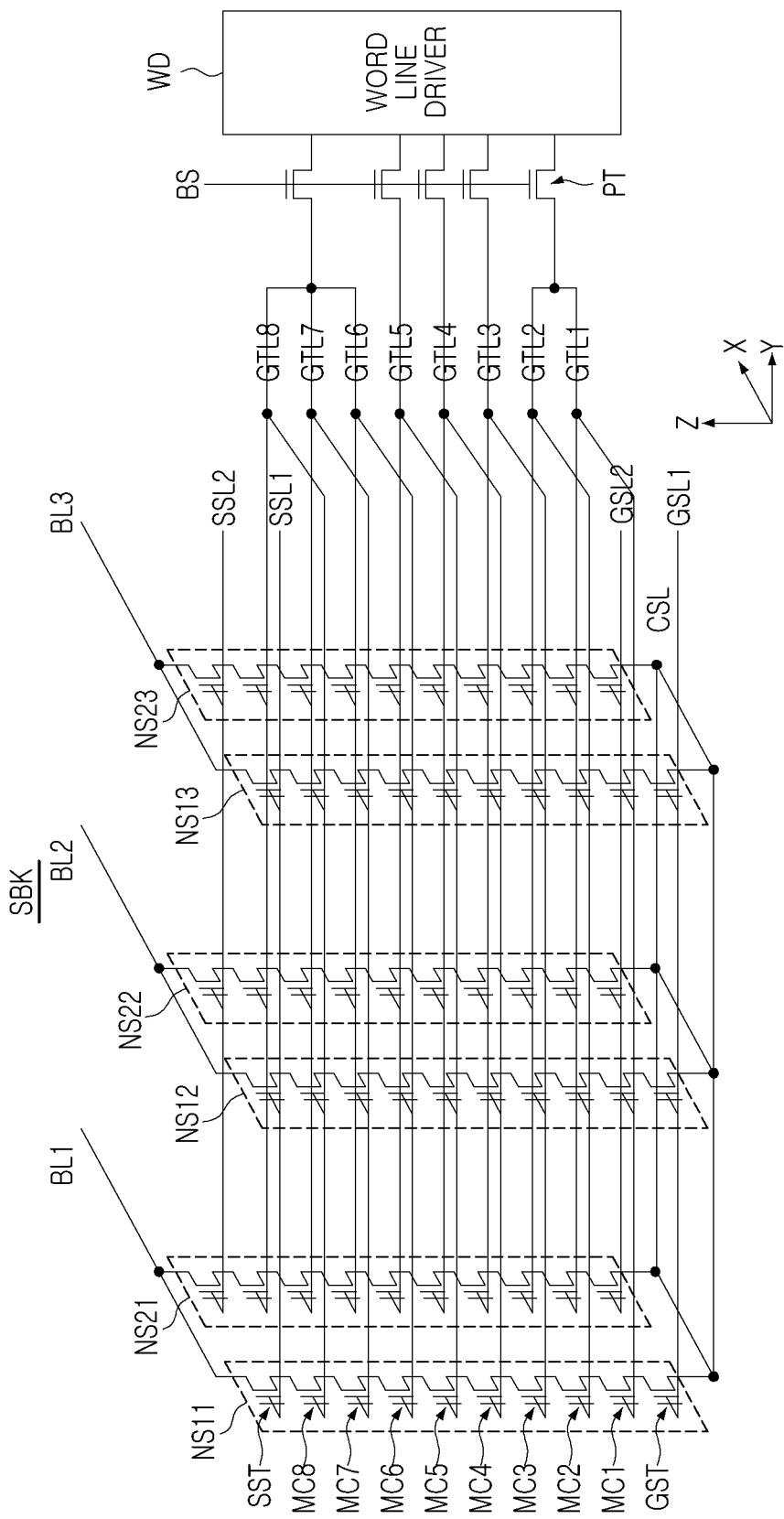

FIGS. 10, 11A, and 11B are circuit diagrams schematically illustrating blocks included in a memory device according to an embodiment of the present inventive concept.

First, FIG. 10 is a circuit diagram illustrating a main block MBK included in a memory device. Referring to FIG. 10, a main block MBK may be formed in a three-dimensional structure on a substrate, and a plurality of NAND strings NS11 to NS33 may be formed in the first direction (the Z-axis direction), perpendicular to the substrate.

Referring to FIG. 10, the main block MBK may include the NAND strings NS11 to NS33 connected between bit lines BL1, BL2, and BL3 and a common source line CSL, extending in the second direction (the Y-axis direction). Each of the NAND strings NS11 to NS33 may include a string select transistor SST, a plurality of memory cells MC1 to MC8, and a ground select transistor GST. In FIG. 10, each of the NAND strings NS11 to NS33 is illustrated as including eight (8) memory cells MC1 to MC8, but the amount of memory cells is not limited thereto. Two or more bits of data may be stored in each of the plurality of memory cells MC1 to MC8.

The string select transistor SST may be connected to string selection lines SSL1, SSL2, and SSL3, corresponding thereto. Each of the plurality of memory cells MC1 to MC8 may be connected to gate lines GTL1 to GTL8, corresponding thereto. The gate lines GTL1 to GTL8 may correspond to word lines, and at least one of the gate lines GTL1 to GTL8 may be a dummy word line. The ground select transistor GST may be connected to ground selection lines GSL1, GSL2, and GSL3, corresponding thereto. The string select transistor SST may be connected to the bit lines BL1, BL2, and BL3, corresponding thereto, and the ground select transistor GST may be connected to the common source line CSL.

The gate lines GTL1 to GTL8 having the same height may be connected in common, and the ground selection lines GSL1, GSL2, and GSL3 and the string selection lines SSL1, SSL2, and SSL3 may be separated from each other. FIG. 10 illustrates that the main block MBK is connected to the eight (8) gate lines GTL1 to GTL8 and the three (3) bit lines BL1, BL2, and BL3, but the number of these lines is not limited thereto.

The gate lines GTL1 to GTL8 may be connected to a word line driver WD through pass transistors PT. The pass transistors PT and the word line driver WD may be included in a row decoder, and the pass transistors PT and the gate lines GTL1 to GTL8 may be connected to each other through wiring patterns. The pass transistors PT may be simultaneously turned on and turned off by a block control signal BS, and the word line driver WD may input a word line voltage to each of the gate lines GTL1 to GTL8 according to an operation to be executed.

FIGS. 11A and 11B are circuit diagrams illustrating a spare block SBK included in a memory device. Referring to FIGS. 11A and 11B, a spare block SBK may be formed in a three-dimensional structure on a substrate, and a plurality of NAND strings NS11 to NS23 may be formed in a direction, perpendicular to the substrate. For example, the spare block SBK may have a structure similar to the main block MBK.

As illustrated in FIGS. 11A and 11B, the number of NAND strings NS11 to NS23 included in the spare block SBK may be less than the number of NAND strings NS11 to NS33 included in the main block MBK. Therefore, the number of memory cells MC1 to MC8 included in the spare block SBK may be less than the number of memory cells MC1 to MC8 included in the main block MBK. Accordingly, the spare block SBK may be formed to have a smaller area than the main block MBK, as described above with reference to FIGS. 5 to 9. For example, the number of string selection lines SSL1 and SSL2 included in the spare block SBK may be less than the number of string selection lines SSL1, SSL2, and SSL3 included in the main block MBK. As the number of string selection lines SSL1 and SSL2 decreases, the spare block SBK may have a length shorter than the main block MBK, in the second direction.

A row decoder including pass transistors PT and a word line driver WD may be disposed on one side of the spare block SBK in the third direction (the X-axis direction) in the memory device. Unlike gate lines GTL1 to GTL8, the pass transistors PT and the word line driver WD may not be stacked in the first direction, and may be separated from each other in the second and/or third directions on the substrate. Therefore, a space in which pass transistors PT and a word line driver WD connected to the spare block SBK, and wiring patterns connecting the pass transistors PT to the spare block SBK are arranged may be insufficient compared to the main block MBK.

In an embodiment of the present inventive concept, at least a portion of the pass transistors PT and/or the wiring patterns connecting the pass transistors PT and the spare block SBK may be connected to the gate lines GTL1 to GTL8 in common, to address the above situation. Referring to FIG. 11A, first and second gate lines GTL1 and GTL2 may be connected to pass transistors PT through one (1) wiring pattern, and sixth to eighth gate lines GTL6 to GTL8 may be connected to pass transistors PT through one (1) wiring pattern. In the embodiment illustrated in FIG. 11B, first and second gate lines GTL1 and GTL2 may share one (1) pass transistor PT, and sixth to eighth gate lines GTL6 to GTL8 may share the other one (1) pass transistor PT. Therefore, an area in which pass transistors PT and wiring patterns connecting the pass transistors PT to the spare block SBK are arranged may be reduced.

In the embodiments described with reference to FIGS. 11A and 11B, some of the gate lines GTL1, GTL2, and GTL6 to GTL8 sharing wiring patterns and/or pass transistors PT may be connected to non-active memory cells that may not be actually used for writing data in the spare block SBK. For example, the memory cells MC3 to MC5 connected to the third to fifth gate lines GTL3 to GTL5 may be allocated as active memory cells that actually store data, and the memory cells MC1, MC2, and MC6 to MC8 connected to the remaining gate lines GTL1, GTL2, and GTL6 to GTL8 may be allocated as non-active memory cells that do not actually store data.

For example, active memory cells may be determined according to their positions in the first direction. A control logic circuit of a memory device may select memory cells separated by a predetermined distance from ground selection lines GSL1 and GSL2 and string selection lines SSL1 and SSL2 as active memory cells. In an embodiment, memory cells adjacent to the ground selection lines GSL1 and GSL2 and the string selection lines SSL1 and SSL2 may be determined as non-active memory cells.

In an embodiment, one bit of data may be stored in each of the active memory cells of the spare block SBK. The spare block SBK may store data used for an operation of the memory device, and may store only one bit of data in each of the active memory cells to ensure integrity and reliability for data. Even when two or more bits of data are stored in each of the memory cells MC1 to MC8 included in the main block MBK, one bit of data may be stored in each of the active memory cells of the spare block SBK.

Figure 12:
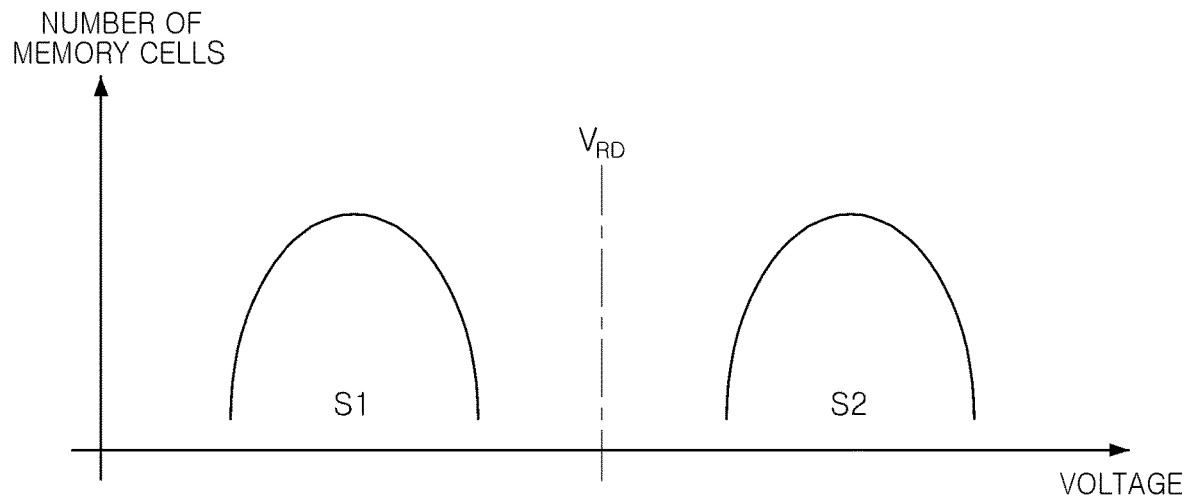
FIGS. 12 and 13 are views illustrating an operation of a memory device according to an embodiment of the present inventive concept.
Figure 13:
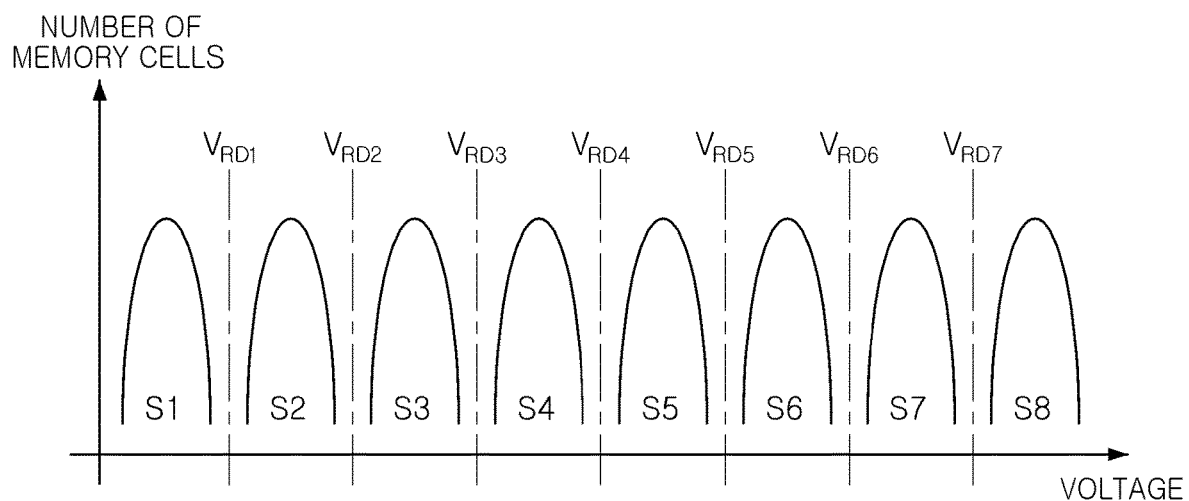

FIGS. 12 and 13 are views illustrating an operation of a memory device according to an embodiment of the present inventive concept.

FIGS. 12 and 13 are views illustrating a threshold voltage distribution of memory cells according to the number of bits of data stored in each of the memory cells included in a memory device. For example, in one embodiment, FIG. 12 illustrates a threshold voltage distribution of active memory cells arranged in a spare block and storing 1-bit data.

Referring to FIG. 12, active memory cells of a spare block may have one of a first state S1 and a second state S2. The active memory cells in the first state S1 may have a lower threshold voltage than the active memory cells in the second state S2. In the embodiment illustrated in FIG. 12, a read voltage $V_{RD}$ input to word lines of the spare block for a read operation may be a voltage between the first state S1 and the second state S2.

FIG. 13 illustrates a threshold voltage distribution of active memory cells arranged in a main block and respectively storing 3-bit data. In the embodiment illustrated in FIG. 13, each of the memory cells of the main block may have any one of first to eighth states S1 to S8. The row decoder connected to the main block may input first to seventh read voltages $V_{RD1}$ to $V_{RD7}$ between the first to eighth states S1 to S8 to word lines, to perform a read operation.

Referring to FIGS. 12 and 13, as the number of bits of data stored in each of the memory cells increases, a threshold voltage distribution may be narrowed. Therefore, according to one embodiment, in a spare block for storing data used and/or necessary for an operation of a memory device, only one bit of data is written to each of the active memory cells to sufficiently secure integrity and reliability of the data. In each of memory cells of a main block, two or more bits of data may be written to sufficiently secure storage capacitance of a memory device.

Figure 14:
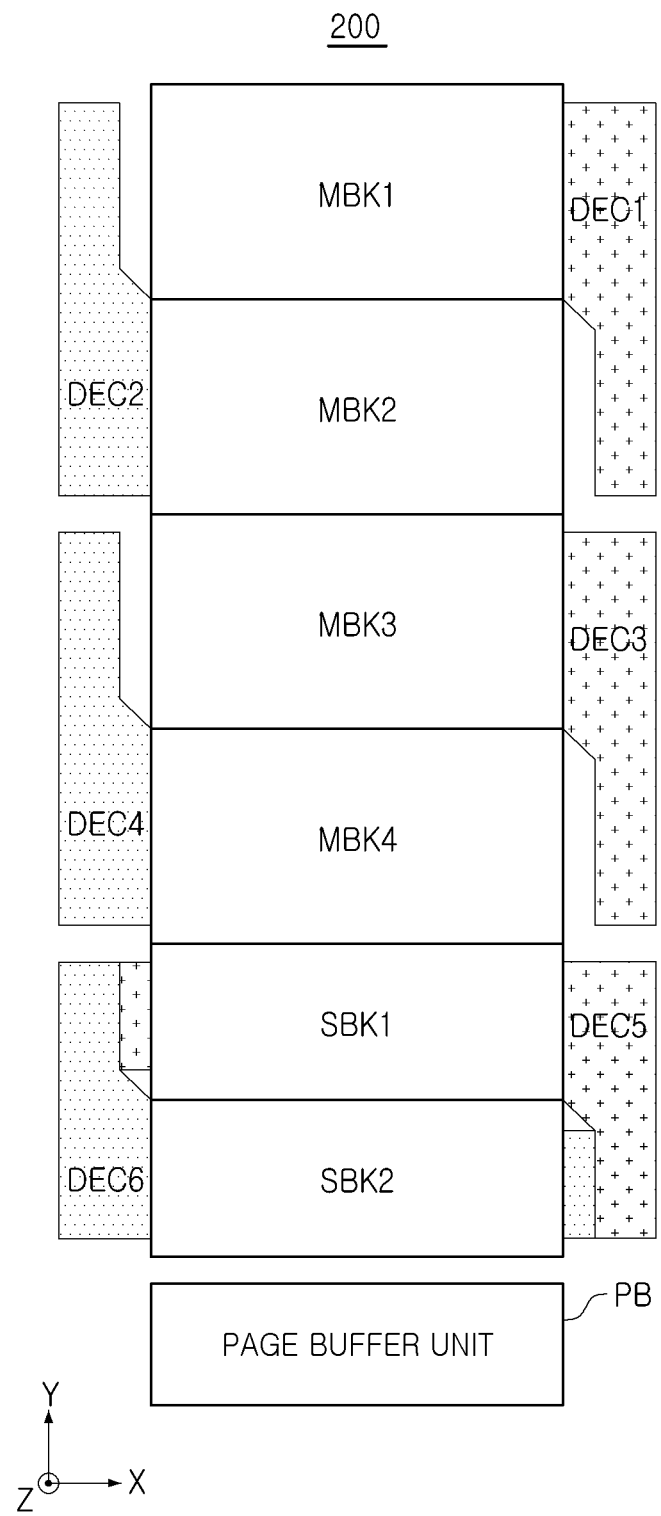
FIG. 14 is a view schematically illustrating a configuration of a plane included in a memory device according to an embodiment of the present inventive concept.

FIG. 14 is a view schematically illustrating a configuration of a plane included in a memory device according to an embodiment of the present inventive concept.

FIG. 14 illustrates a configuration of a plane including at least one spare block (e.g., SBK1 and SBK2 in this example), among planes included in a memory device 200, according to an embodiment of the present inventive concept. Referring to FIG. 14, a plane of a memory device 200 may include main blocks MBK1 to MBK4 and spare blocks SBK1 and SBK2. An arrangement and the number of the main blocks MBK1 to MBK4 and the spare blocks SBK1 and SBK2 may be variously changed according to embodiments. For example, the spare blocks SBK1 and SBK2 may be disposed between at least a some of the main blocks MBK1 to MBK4. The main blocks MBK1 to MBK4 and the spare blocks SBK1 and SBK2 may include a plurality of gate electrode layers stacked in the first direction (the Z-axis direction) and a plurality of channel structures, extending in the first direction, respectively.

The main blocks MBK1 to MBK4 and the spare blocks SBK1 and SBK2 may be arranged in the second direction (the Y-axis direction). In the main blocks MBK1 to MBK4 and the spare blocks SBK1 and SBK2, the gate electrode layers may extend in the third direction (the X-axis direction), and may be connected to row decoders DEC1 to DEC6 in the third direction. For example, the gate electrode layers included in a first spare block SBK1 may be connected to a fifth row decoder DEC5 disposed on a right side in the third direction. The gate electrode layers included in a second spare block SBK2 may be connected to a sixth row decoder DEC6 disposed on a left side in the third direction.

A page buffer unit PB may be disposed on one side of the main blocks MBK1 to MBK4 and the spare blocks SBK1 and SBK2 in the second direction. The page buffer unit PB may be connected to the channel structures disposed in the main blocks MBK1 to MBK4 and the spare blocks SBK1 and SBK2 through bit lines extending in the second direction. For example, the page buffer unit PB may include a plurality of page buffers, and each of the page buffers may be connected to one or more channel structures through a bit line.

A length of each of the spare blocks SBK1 and SBK2 may be shorter than a length of each of the main blocks MBK1 to MBK4, in the second direction. An arrangement space of each of the fifth and sixth row decoders DEC5 and DEC6 connected to the gate electrode layers of the spare blocks SBK1 and SBK2, respectively, may be smaller than an arrangement space of each of the first to fourth row decoders DEC1 to DEC4 connected to the gate electrode layers of each of the main blocks MBK1 to MBK4. The number of gate electrode layers included in each of the spare blocks SBK1 and SBK2 may be identical to the number of gate electrode layers included in each of the main blocks MBK1 to MBK4. Therefore, it may be difficult to arrange each of the fifth and sixth row decoders DEC5 and DEC6.

In the embodiment illustrated in FIG. 14, a portion of the fifth row decoder DEC5 may be disposed on the left side of the first spare block SBK1, and a portion of the sixth row decoder DEC6 may be disposed on the right side of the second spare block SBK2, from a plan view. For example, a group of the devices included in the fifth row decoder DEC5 may be disposed in a space between the sixth row decoder DEC6 and the first spare block SBK1 in the third direction. For example, a group of pass transistors included in the fifth row decoder DEC5 and connected to gate electrode layers of the first spare block SBK1 may be disposed on the left side of the first spare block SBK1.

According to some embodiments, the structure according to the embodiments described above with reference to FIGS. 11A and 11B may be applied to the spare blocks SBK1 and SBK2 and the fifth and sixth row decoders DEC5 and DEC6. For example, at least one of wiring patterns connected between the pass transistors included in the fifth row decoder DEC5 and word lines included in the first spare block SBK1 may be connected to at least two pass transistors and at least two word lines in common. Alternatively, two or more of the word lines included in the first spare block SBK1 may be connected to at least one of the pass transistors included in the fifth row decoder DEC5 in common. In this case, the number of pass transistors included in the fifth row decoder DEC5 may be less than the number of pass transistors included in each of the first to fourth row decoders DEC1 to DEC4.

Figure 15:
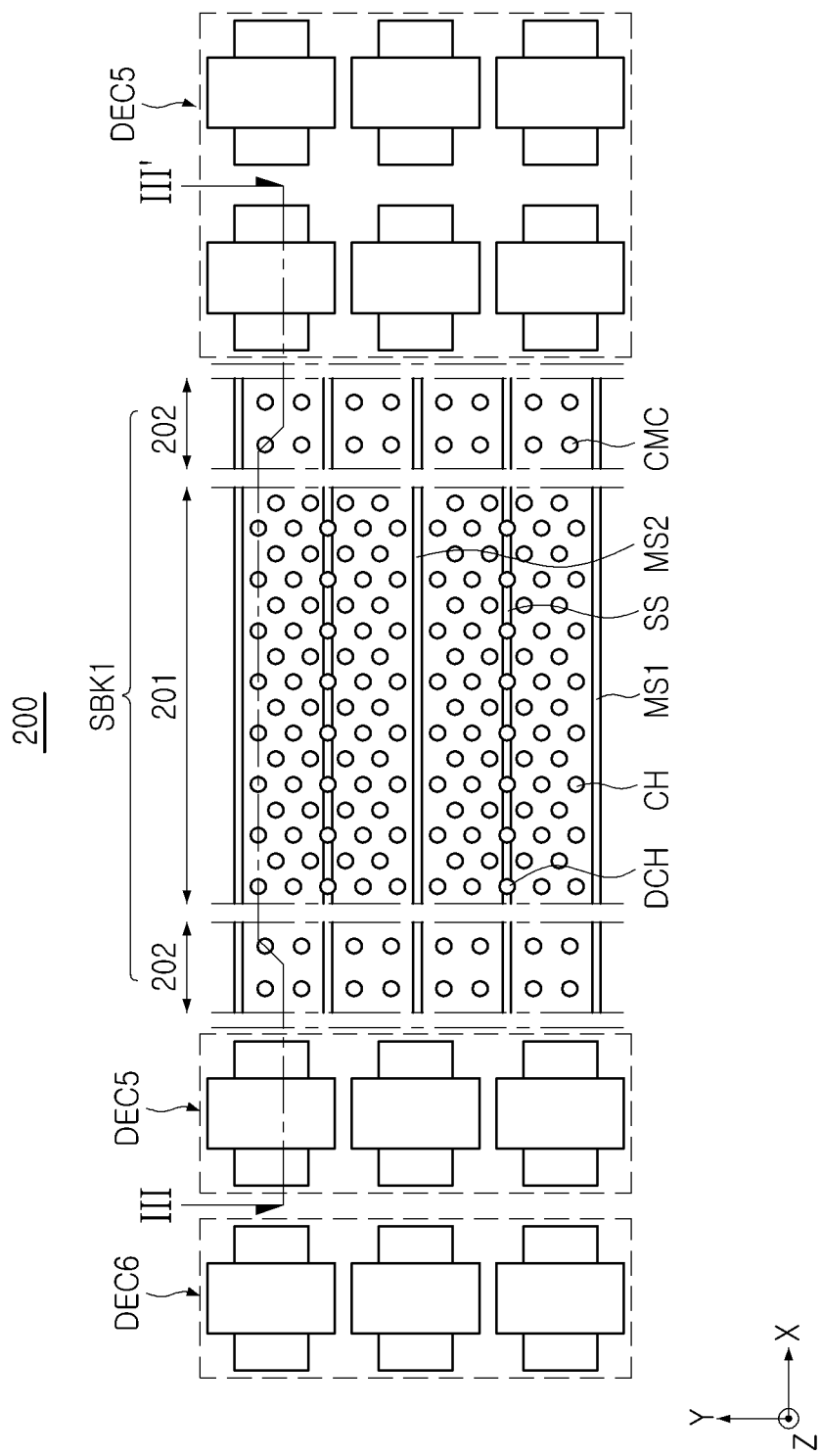
FIGS. 15 and 16 are views schematically illustrating blocks included in a memory device according to an embodiment of the present inventive concept.
Figure 16:
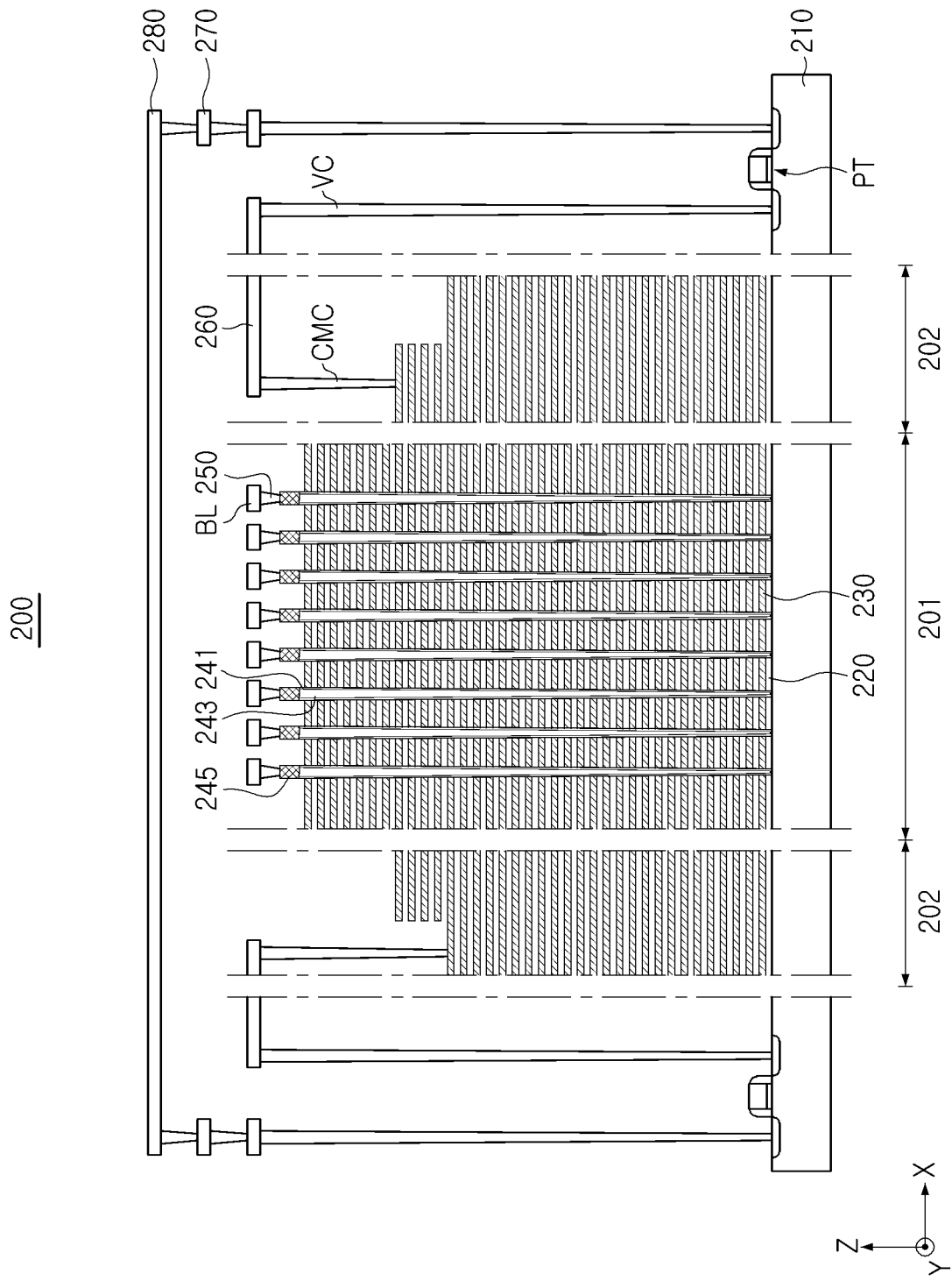

FIGS. 15 and 16 are views schematically illustrating blocks included in a memory device according to an embodiment of the present inventive concept.

FIG. 15 is a plan view illustrating the first spare block SBK1 included in the memory device 200 and some peripheral circuits connected to the gate electrode layers of the spare block SBK1, according to the embodiment described with reference to FIG. 14. FIG. 16 is a cross-sectional view illustrating FIG. 15, taken along line according to one embodiment.

Referring to FIGS. 15 and 16, a first spare block SBK1 may include a substrate 210, a plurality of insulating layers 220 and a plurality of gate electrode layers 230, stacked on the substrate 210, a plurality of channel structures CH extending in the first direction (the Z-axis direction) and passing through the gate electrode layers 230 to extend to the substrate 210, and the like. Features of the insulating layers 220, the gate electrode layers 230, and the channel structures CH may be similar to those described above with reference to FIGS. 5 and 6. For example, each of the channel structures CH may include a channel layer 241, a buried insulating layer 243, a bit line connection layer 245, and the like, and may be connected to at least one bit line of bit lines BL through bit line contacts 150 thereon. The bit lines BL may extend in the second direction (the Y-axis direction).

The first spare block SBK1 may include a first region 201 and a second region 202. The first region 201 may be a cell array region in which the channel structures CH are disposed, and the second region 202 may be a pad region in which cell contacts CMC connected to the gate electrode layers 230 are disposed. In the second region 202, the gate electrode layers 230 may extend to have different lengths in the third direction (the X-axis direction) to form a step difference. According to embodiments, at least a portion of the gate electrode layers 230, for example, two or more gate electrode layers 230, may form one group to form a step difference in the third direction. In this case, two or more gate electrode layers included in the one group may form a step difference in the second direction.

As described above with reference to FIG. 14, the gate electrode layers 230 of the first spare block SBK1 may be connected to a fifth row decoder DEC5. Due to characteristics of the first spare block SBK1 having a shorter length than the main blocks MBK1 to MBK4, in the second direction, it may be difficult to arrange the fifth row decoder DEC5 on one side of the first spare block SBK1 in the third direction.

Referring to FIGS. 15 and 16, devices included in the fifth row decoder DEC5, for example, pass transistors PT, may be distributed on both sides of the first spare block SBK1, to distribute the fifth row decoder DEC5 efficiently. When the pass transistors PT are distributed on the both sides of the first spare block SBK1, lengths of wiring patterns connecting the gate electrode layers 230 and the pass transistors PT may be shortened, as compared to a case in which all of the pass transistors PT are disposed on one side of the first spare block SBK1. Therefore, resistance characteristics may be improved, and performance of the memory device 200 may be improved.

The pass transistors PT may be connected to at least one of the cell contacts CMC through a vertical contact VC and a first upper wiring pattern 260. In addition, the pass transistors PT, distributed on the both sides of the first spare block SBK1 in the third direction, may be connected to each other through a second upper wiring pattern 270 and a third upper wiring pattern 280. For example, the third upper wiring pattern 280 may be connected to an active region not directly connected to the gate electrode layers 230 among active regions of the pass transistors PT, and may connect a word line driver and pass transistors PT.

As described with reference to FIG. 14, devices included in the fifth row decoder DEC5 and devices included in the sixth row decoder DEC6 may be disposed on one side of the first spare block SBK1. The sixth row decoder DEC6 may be connected to gate electrode layers of a second spare block SBK2, different from the first spare block SBK1. According to embodiments, the sixth row decoder DEC6 may be a row decoder connected to one of main blocks MBK1 to MBK4, different from the first spare block SBK1. Referring to FIG. 15, a portion of the devices of the fifth row decoder DEC5 may be disposed between the sixth row decoder DEC6 and the first spare block SBK1 in the third direction.

Figure 17:
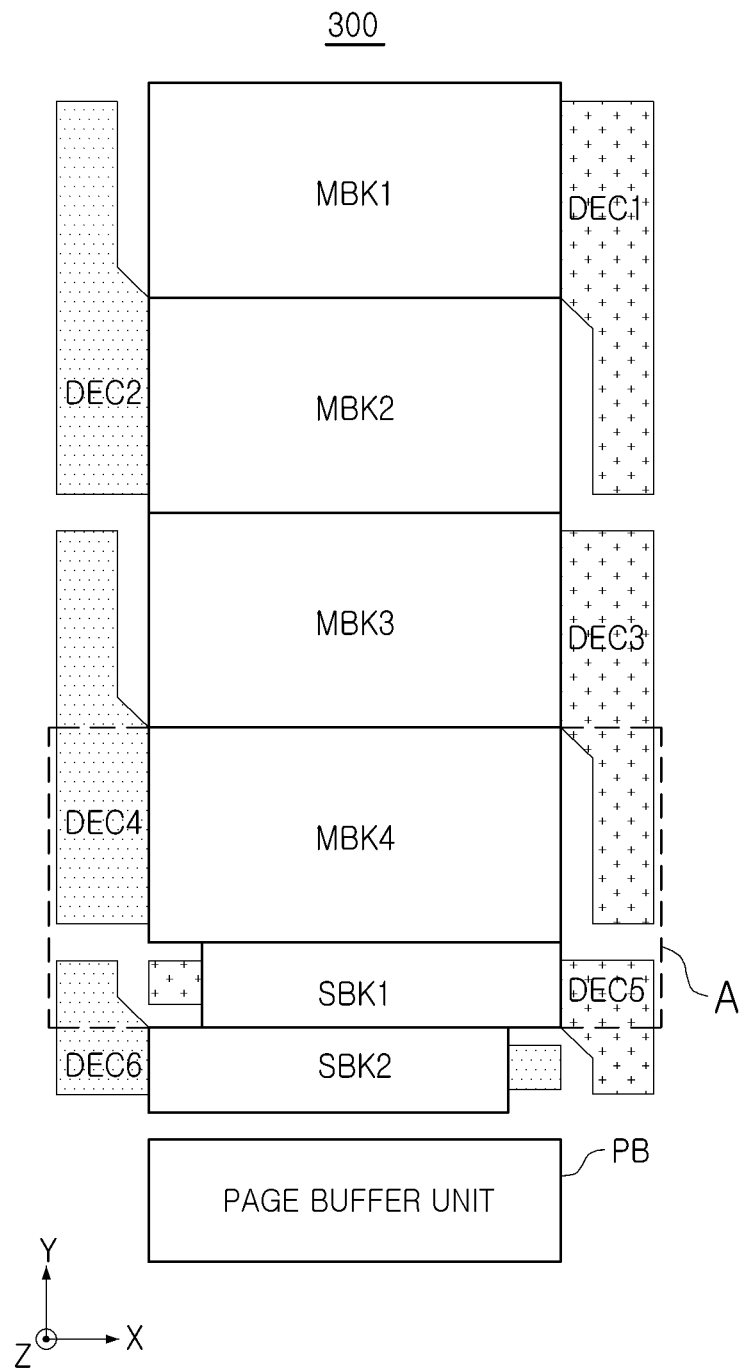
FIG. 17 is a view schematically illustrating a configuration of a plane included in a memory device according to an embodiment of the present inventive concept.

FIG. 17 is a view schematically illustrating a configuration of a plane included in a memory device according to an embodiment of the present inventive concept.

FIG. 17 illustrates a configuration of a plane including at least one spare block (e.g., in one embodiment SBK1 and SBK2), among planes included in a memory device 300, according to an embodiment of the present inventive concept. Referring to FIG. 17, a plane of a memory device 300 may include main blocks MBK1 to MBK4 and spare blocks SBK1 and SBK2, and an arrangement and the number of the main blocks MBK1 to MBK4 and the spare blocks SBK1 and SBK2 may be variously changed according to embodiments.

The main blocks MBK1 to MBK4 and the spare blocks SBK1 and SBK2 may include a plurality of gate electrode layers stacked in the first direction (the Z-axis direction) and a plurality of channel structures, extending in the first direction, respectively, and may be arranged in the second direction (the Y-axis direction). In each of the main blocks MBK1 to MBK4 and the spare blocks SBK1 and SBK2, the gate electrode layers may extend in the third direction (the X-axis direction), and may be connected to row decoders DEC1 to DEC6 in the third direction. A page buffer unit PB may be connected to the channel structures disposed in the main blocks MBK1 to MBK4 and the spare blocks SBK1 and SBK2 through bit lines extending in the second direction.

A length of each of the spare blocks SBK1 and SBK2 may be shorter than a length of each of the main blocks MBK1 to MBK4, in the second direction. Therefore, an arrangement space of each of the fifth and sixth row decoders DEC5 and DEC6 may be smaller than an arrangement space of each of the first to fourth row decoders DEC1 to DEC4. The number of gate electrode layers included in each of the main blocks MBK1 to MBK4 may be identical to the number of gate electrode layers included in each of the spare blocks SBK1 and SBK2. Therefore, it may be difficult to arrange each of the fifth and sixth row decoders DEC5 and DEC6.

In the embodiment illustrated in FIG. 17, after removing a region from each of the spare blocks SBK1 and SBK2, a portion of devices included in the fifth and sixth row decoders DEC5 and DEC6 may be disposed in the region. Therefore, even though the spare blocks SBK1 and SBK2 have a relatively small area, as compared to the main blocks MBK1 to MBK4, a space for arranging the fifth and sixth row decoders DEC5 and DEC6 may be secured. Hereinafter, this example embodiment will be described in more detail with reference to FIG. 18.

Figure 18:
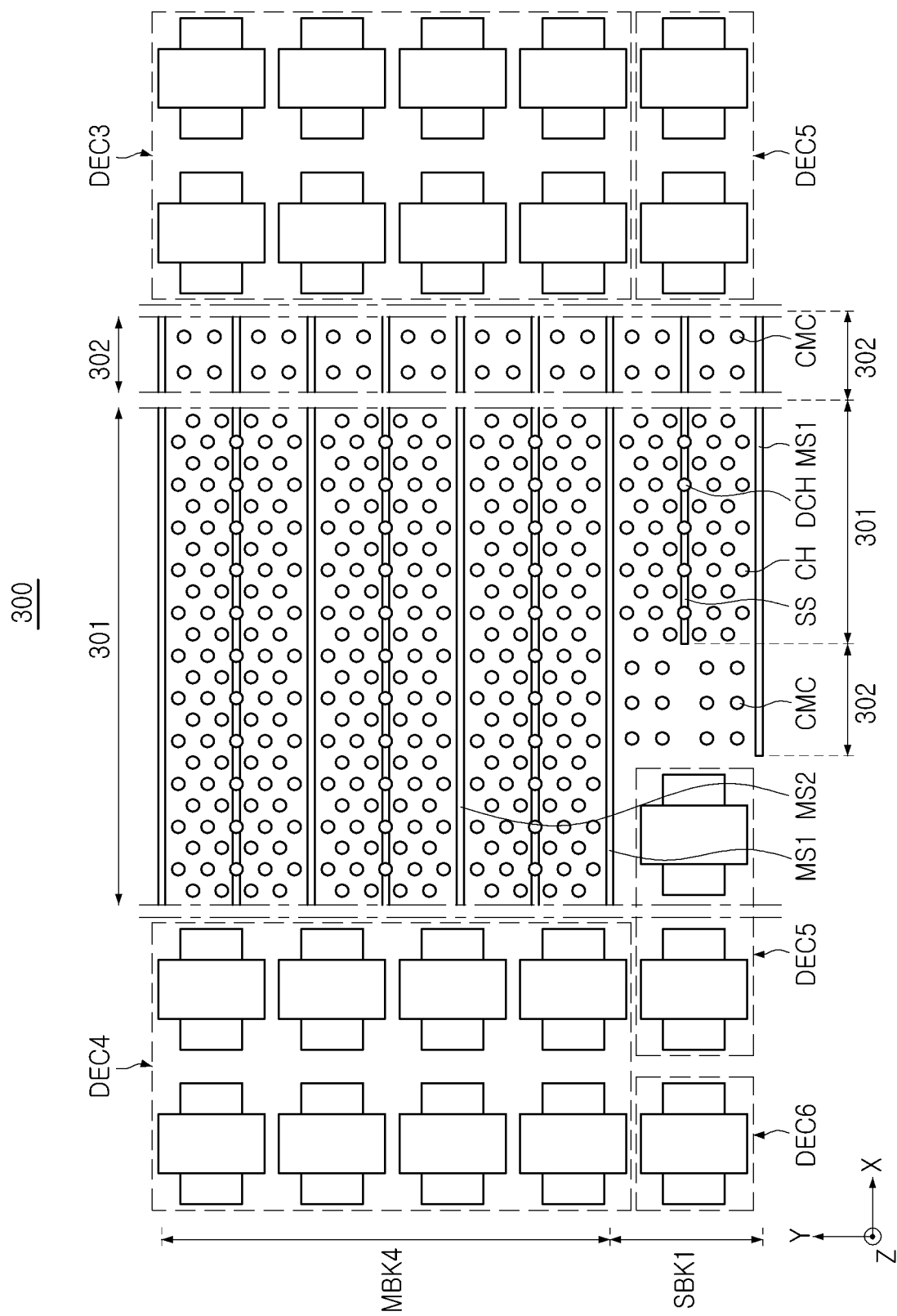
FIG. 18 is a view schematically illustrating a block included in a memory device according to an embodiment of the present inventive concept.

FIG. 18 is a view schematically illustrating a block included in a memory device according to an embodiment of the present inventive concept.

FIG. 18 is a plan view illustrating portion A of FIG. 17. Referring to FIG. 18, a fourth main block MBK4 and a first spare block SBK1 may include a first region 301 and a second region 302, respectively. The first region 301 may be a cell array region in which channel structures CH are disposed, and the second region 302 may be a pad region in which cell contacts CMC connected to gate electrode layers are disposed.

As described above with reference to FIG. 14, gate electrode layers of the first spare block SBK1 may be connected to a fifth row decoder DEC5. Elements included in the fifth row decoder DEC5 may be distributed on both sides of the first spare block SBK1. In the embodiment illustrated in FIG. 18, the first region 301 of the first spare block SBK1 may be formed to be smaller than the first region 301 of the fourth main block MBK4. Therefore, one of the second regions 302 of the first spare block SBK1 may overlap the first region 301 of the fourth main block MBK4 in the second direction (the Y-axis direction).

At least one of the devices of the fifth row decoder DEC5 may be disposed in a space additionally secured by forming the first region 301 of the first spare block SBK1 to be relatively small. It may be sufficient that the first spare block SBK1 provides a smaller capacitance than the main blocks MBK1 to MBK4. Therefore, even when the first region 301 is formed to be relatively small as illustrated in FIG. 18, sufficient capacitance may be secured to store data in the first spare block SBK1. In an embodiment, devices disposed on both sides of the first region 301 of the first spare block SBK1 may be connected to each other by metal wires disposed thereon in the first direction.

Figure 19:
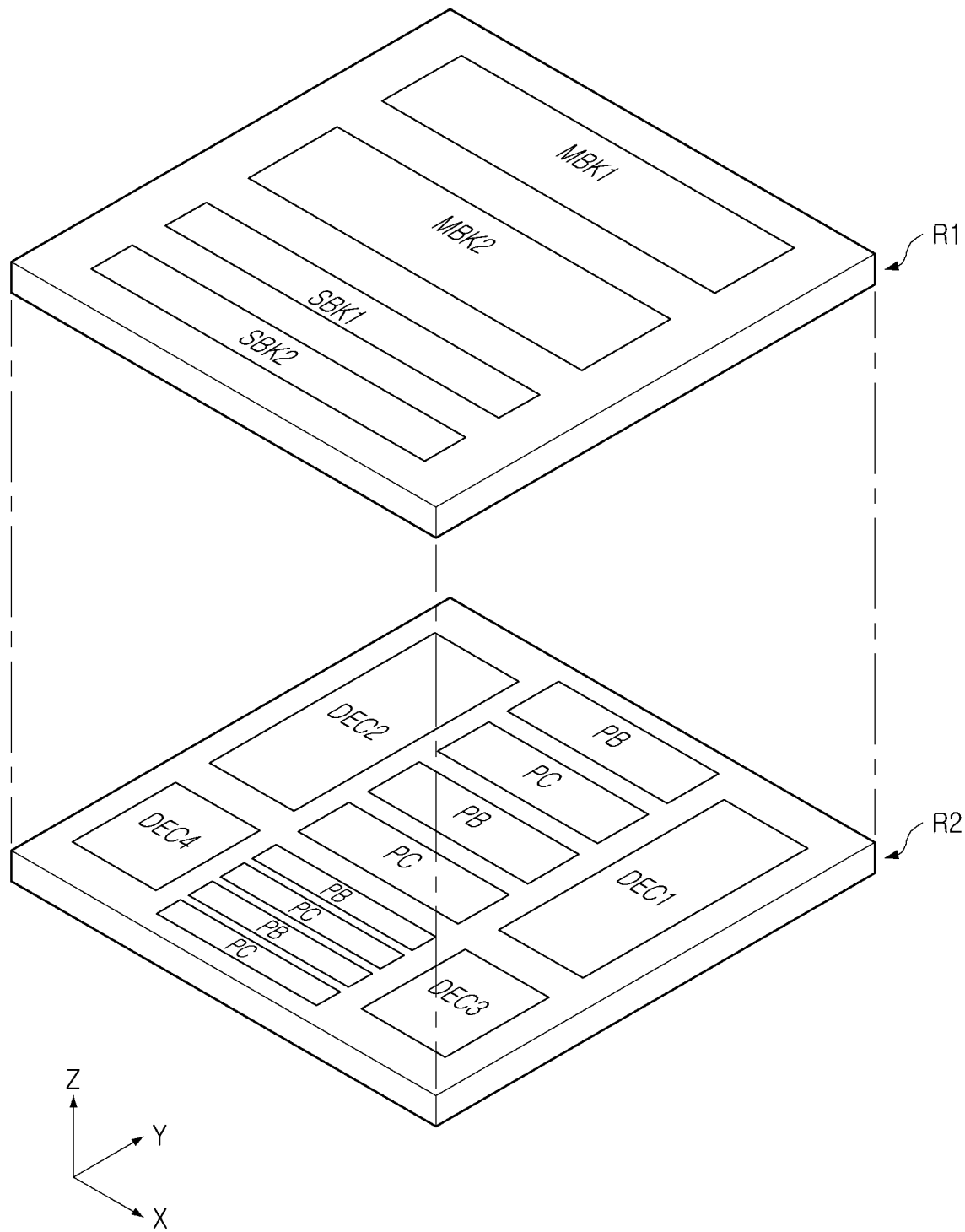
FIG. 19 is a perspective view schematically illustrating a structure of a memory device according to an embodiment of the present inventive concept.

FIG. 19 is a perspective view schematically illustrating a structure of a memory device according to an embodiment of the present inventive concept.

In the embodiment illustrated in FIG. 19, a memory device includes a first layer R1 and a second layer R2. The first layer R1 may provide a cell region, and the second layer R2 may provide a peripheral circuit region. The first layer R1 and the second layer R2 may be stacked in the first direction (the Z-axis direction).

The cell region of the first layer R1 may include a plurality of blocks, and the plurality of blocks may be arranged in the second direction (the Y-axis direction). The plurality of blocks may include main blocks MBK1 and MBK2 and spare blocks SBK1 and SBK2, and the spare blocks SBK1 and SBK2 may have a relatively small area, as compared to the main blocks MBK1 and MBK2.

The peripheral circuit region of the second layer R2 may include row decoders DEC1 to DEC4, page buffers PB, and peripheral circuits PC. The row decoders DEC1 to DEC4 may be disposed on both sides of a plurality of blocks in the third direction (the X-axis direction), and the page buffers PB and the peripheral circuits PC may be arranged between the row decoders DEC1 to DEC4. For example, the page buffers PB may be disposed below a cell array region in which channel structures are disposed in each of the plurality of blocks.

The peripheral circuit PC may be a region including a control logic circuit and a voltage generator, and may include, for example, a latch circuit, a cache circuit, and/or a sense amplifier. The second layer R2 may further include a separate pad region, and in this case, the pad region may include an electrostatic discharge (ESD) device or a data input/output circuit.

Figure 20:
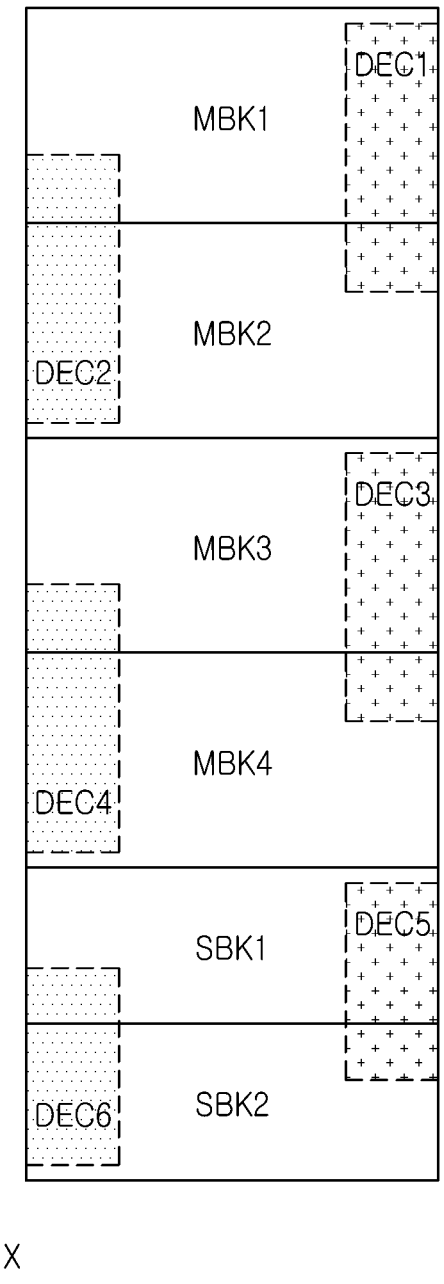
FIG. 20 is a view schematically illustrating a configuration of a plane included in a memory device according to an embodiment of the present inventive concept.

FIG. 20 is a view schematically illustrating a configuration of a plane included in a memory device according to an embodiment of the present inventive concept.

FIG. 20 illustrates a plane including spare blocks SBK1 and SBK2 among a plurality of planes included in a memory device 400. The memory device 400 may have a cell-on-peri or cell-over-peri (COP) structure in which a cell region is disposed on a peripheral circuit region in the first direction (the Z-axis direction). In the embodiment illustrated in FIG. 20, row decoders DEC1 to DEC6 may be disposed below main blocks MBK1 to MBK4 and spare blocks SBK1 and SBK2 included in the cell region.

Figure 21:
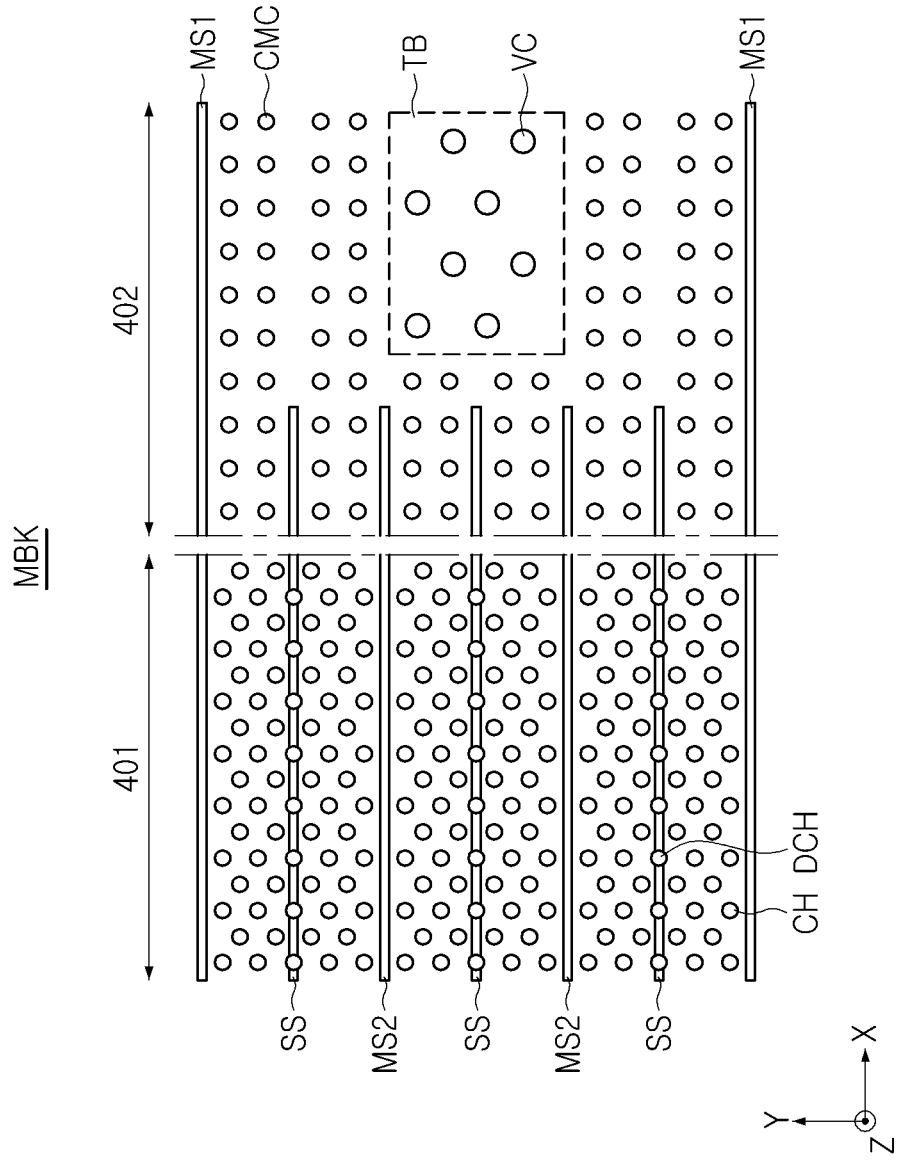
FIGS. 21 to 23 are views schematically illustrating blocks included in a memory device according to an embodiment of the present inventive concept.
Figure 22:
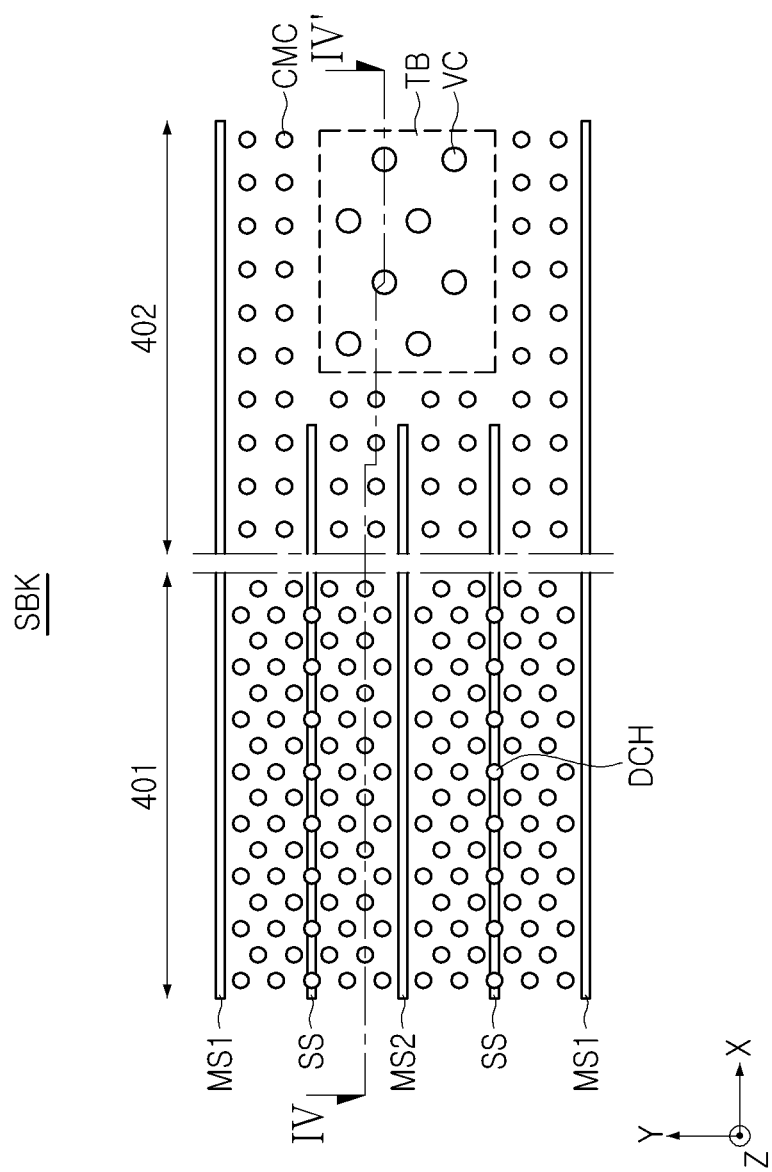
Figure 23:
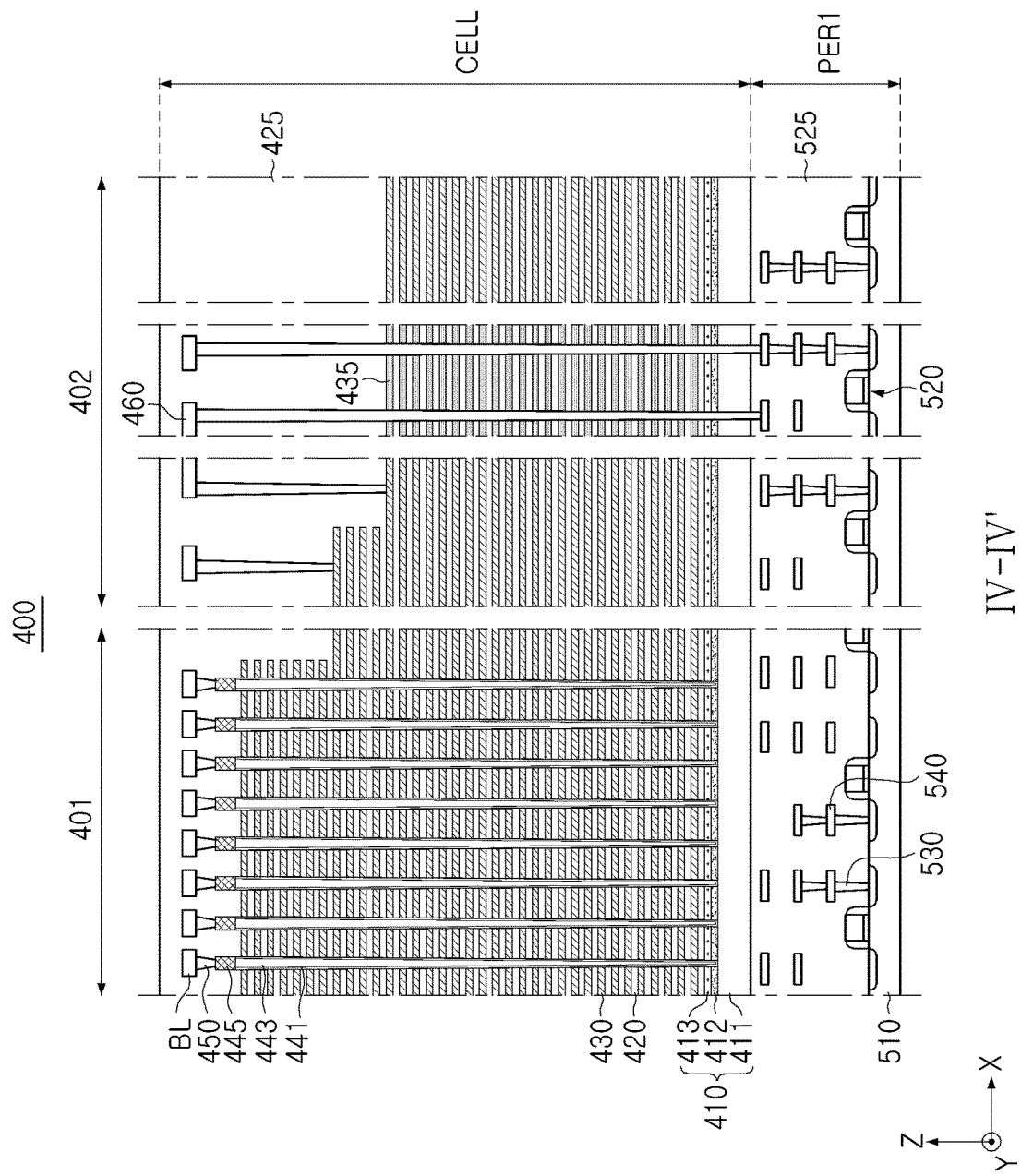

FIGS. 21 to 23 are views schematically illustrating blocks included in a memory device according to an embodiment of the present inventive concept.

FIG. 21 schematically illustrates a portion of a main block MBK included in a cell region of a memory device. Referring to FIG. 21, a main block MBK may include a first region 401 and a second region 402. The first region 401 may be a cell array region in which channel structures CH are disposed, and the second region 402 may be a pad region in which cell contacts CMC connected to gate electrode layers 430 are disposed. The gate electrode layers are stacked in the first direction (the Z-axis direction), and the channel structures CH extend in the first direction and pass through the gate electrode layers 430.

In the first region 401, the gate electrode layers 430 are divided into a plurality of regions in the second direction (the Y-axis direction) by a plurality of separation layers MS1 and MS2. For example, first separation layers MS1 may be separation layers defining the main block MBK, and may extend in the third direction (the X-axis direction). Second separation layers MS2 may be disposed between the first separation layers MS1. The first separation layers MS1 may extend in the third direction in the first region 401 and the second region 402, and the second separation layers MS2 may extend to be shorter than the first separation layers MS1, in the third direction. In the second region 402 in which the second separation layers MS2 are not formed, a connection region TB may be formed.

Vertical contacts VC may be disposed in the connection region TB. The vertical contacts VC may extend in the first direction, and may extend to a peripheral circuit region disposed below a cell region. For example, the vertical contacts VC of FIGS. 21 to 23 and other figures herein may be vertical conductive contacts, in the shape of pillars or plugs. The vertical contacts VC may be continuously formed structures. The vertical contacts VC of FIGS. 21-23 may be electrically connected to the cell contacts CMC in an upper portion in the first direction, and may be electrically connected to devices disposed in the peripheral circuit region in a lower portion in the first direction.

FIG. 22 is a plan view schematically illustrating a portion of a spare block SBK included in a cell region of a memory device. FIG. 23 is a cross-sectional view illustrating FIG. 22, taken along line IV-IV'. Referring to FIGS. 22 and 23, a spare block SBK may include a first region 401 and a second region 402, in a similar manner to a main block MBK. The spare block SBK may include a smaller number of, or a shorter set of, second separation layers MS2 and upper separation layers SS, as compared to the main block MBK. Therefore, in the second direction, a length of the spare block SBK may be shorter than a length of the main block MBK.

As illustrated in FIG. 23, a peripheral circuit region PERI may be disposed below a cell region CELL. The cell region CELL may include a first substrate 410, insulating layers 420 and gate electrode layers 430, alternately stacked on the first substrate 410, and channel structures CH extending to the first substrate 410 in the first direction. An interlayer insulating layer 425 may be disposed on the gate electrode layers 430, and the channel structures CH may be connected to bit lines BL through bit line contacts 450 thereon. Each of the channel structures CH may include a channel layer 441, a buried insulating layer 443, a bit line connection layer 445, and the like.

The first substrate 410 may include first to third layers 411 to 413. The first to third layers 411 to 413 may be formed of a semiconductor material (e.g., the same semiconductor material, or different semiconductor materials). According to embodiments, however, the third layer 413 may be formed of an insulating material. The channel layer 441 included in each of the channel structures CH may contact the second layer 412 in a lateral direction.

A connection region TB of the second region 402 may not include the gate electrode layers 430. As illustrated in FIG. 22, the second separation layers MS2 are not formed in the connection region TB. Therefore, in a process of removing sacrificial layers 435 between the insulating layers 420 to form the gate electrode layers 430, the sacrificial layers 435 may remain without being removed. Therefore, the connection region TB may include the insulating layers 420 and the sacrificial layers 435, alternately stacked in the first direction.

The peripheral circuit region PERI may include a second substrate 510, a plurality of devices 520 formed on the second substrate 510, device contacts 530 connected to the devices 520, wiring patterns 540, and the like. A lower interlayer insulating layer 525 may be formed on the second substrate 510, and the cell region CELL may be formed on the lower interlayer insulating layer 525.

Vertical contacts VC formed in the connection region TB may be connected to cell contacts CMC by a first upper wiring pattern 460. In addition, the vertical contacts VC may be connected to the wiring patterns 540 of the peripheral circuit region PERI. For example, the vertical contacts VC may be connected to pass transistors, among the devices 520, formed in the peripheral circuit region PERI through the wiring patterns 540. For example, a row decoder connected to the spare block SBK may be disposed below the connection region TB formed in the second region 402 of the spare block SBK.

Figure 24:
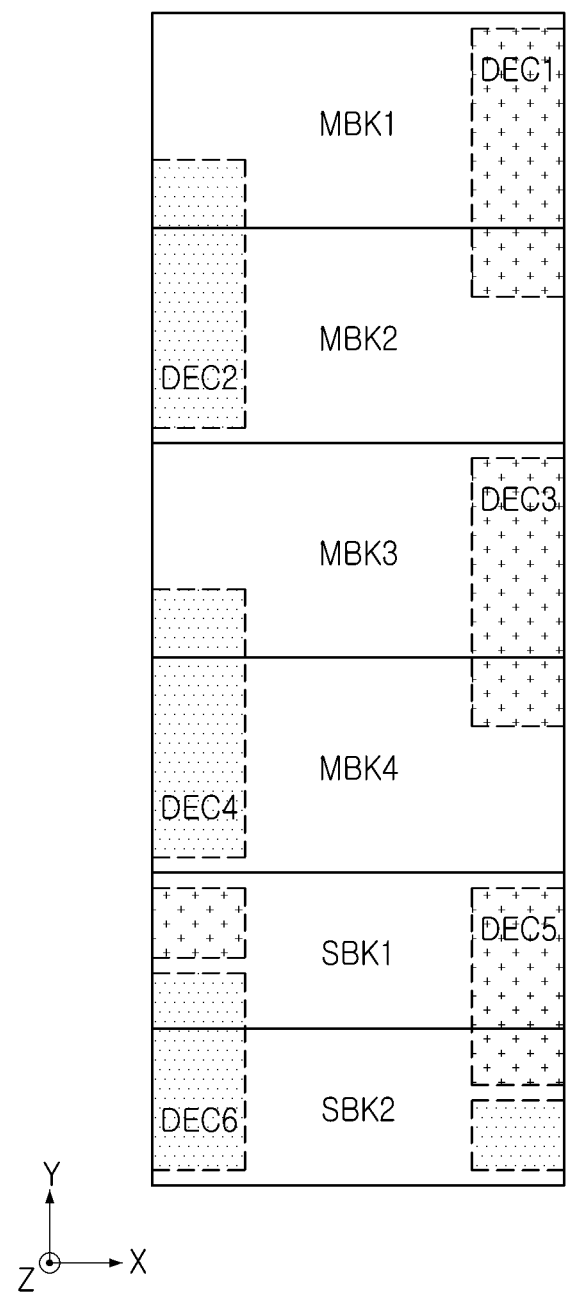
FIG. 24 is a view schematically illustrating a configuration of a plane included in a memory device according to an embodiment of the present inventive concept.

FIG. 24 is a view schematically illustrating a configuration of a plane included in a memory device according to an embodiment of the present inventive concept.

FIG. 24 is a plan view schematically illustrating a plane including spare blocks SBK1 and SBK2 in a memory device 600. The memory device 600 has a COP structure in which a cell region is disposed on a peripheral circuit region in the first direction (the Z-axis direction). A plurality of blocks included in the cell region are disposed in the second direction (the Y-axis direction).

In the embodiment illustrated in FIG. 24, row decoders DEC1 to DEC6 are disposed below main blocks MBK1 to MBK4 and spare blocks SBK1 and SBK2, included in the cell region. In addition, devices respectively included in a fifth row decoder DEC5 and a sixth row decoder DEC6 connected to the spare blocks SBK1 and SBK2 may be distributed on both sides in the third direction (the X-axis direction). Therefore, as an area of each of the spare blocks SBK1 and SBK2 decreases, a problem in that an arrangement space of the fifth and sixth row decoders DEC5 and DEC6 decreases may be addressed.

Figure 25:
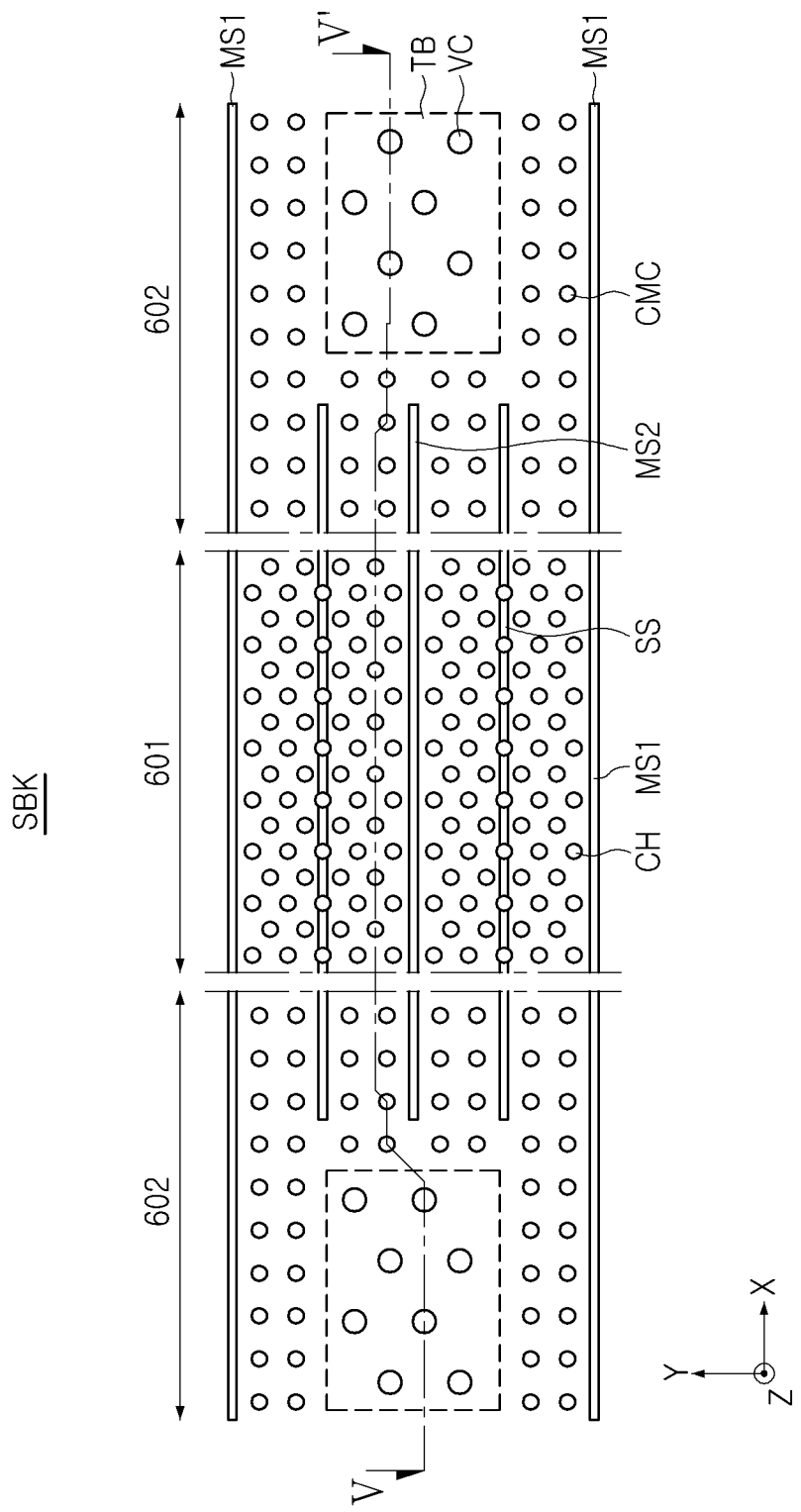
FIGS. 25 and 26 are views schematically illustrating blocks included in a memory device according to an embodiment of the present inventive concept.
Figure 26:
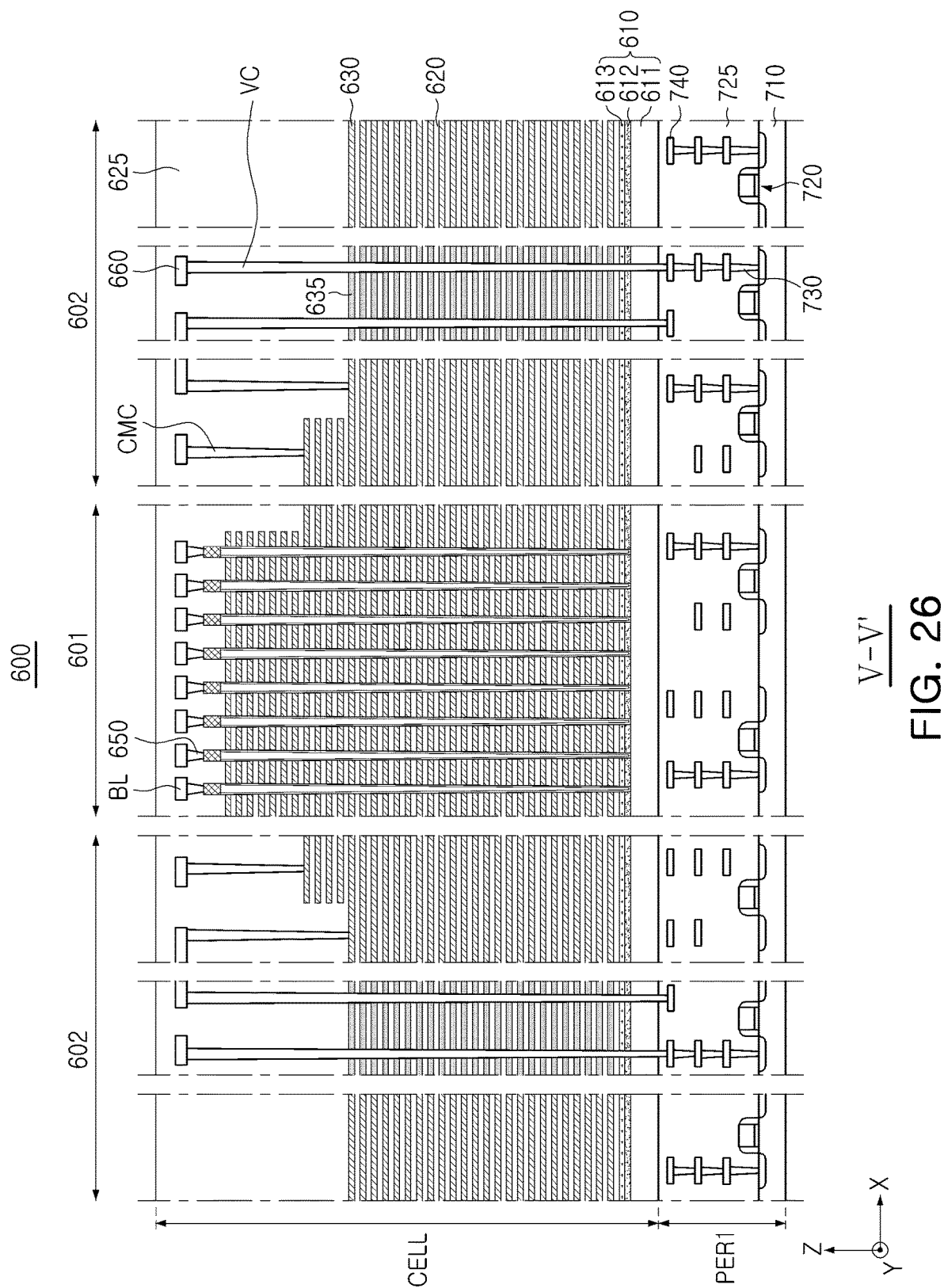

FIGS. 25 and 26 are views schematically illustrating blocks included in a memory device according to an embodiment of the present inventive concept.

FIG. 25 is a plan view schematically illustrating a portion of a spare block SBK included in a memory device 600. FIG. 26 is a cross-sectional view illustrating FIG. 25, taken along line V-V'. Referring to FIGS. 25 and 26, a spare block SBK includes a first region 601 that may be a cell array region including channel structures CH, and a second region 602 that may be a pad region including cell contacts CMC.

As described above with reference to FIG. 24, the spare block SBK may have a smaller area than other blocks, for example, a main block. Therefore, a space for arranging a row decoder connected to the spare block SBK may not be sufficiently secured. In the embodiment illustrated in FIGS. 25 and 26, devices of the row decoder connected to the spare block SBK may be distributed below the second regions 602 on both sides of the first region 601. Therefore, as illustrated in FIG. 25, all of the second regions 602 on both sides of the first region 601 may include a connection region TB. The devices of the row decoder may be disposed below the connection region TB of each of the second regions 602.

Referring to FIG. 26, basic configurations of a cell region CELL and a peripheral circuit region PERI may be similar to those described with reference to FIG. 23. The cell region CELL includes a first substrate 610, insulating layers 620, gate electrode layers 630, channel structures CH, and the like, and the connection region TB may not include gate electrode layers 630, but may include sacrificial layers 635. The channel structures CH may be connected to bit lines BL through bit line contacts 650. The peripheral circuit region PERI includes a second substrate 710, a plurality of devices 720, device contacts 730 connected to the plurality of devices 720, wiring patterns 740, and the like. The cell region CELL is disposed on a lower interlayer insulating layer 725.

Vertical contacts VC extend from a first upper wiring pattern 660 connected to the cell contacts CMC to the peripheral circuit region PERI, and may be connected to the wiring patterns 740 of the peripheral circuit region PERI. For example, the vertical contacts VC may be connected to devices 720 providing a row decoder, among the devices 720, through the wiring patterns 740.

The devices of the row decoder, distributed below the second regions 602 located on both sides of the first region 601, may be electrically connected to each other by various methods. For example, wiring patterns 740 for connecting devices of a row decoder disposed on one side of the first region 601 to devices of a row decoder disposed on the other side of the first region 601 may be formed in the peripheral circuit region PERI. Alternatively, devices of row decoders disposed on both sides of the first region 601 may be electrically connected to each other using wiring patterns disposed on a higher level than the first upper wiring pattern 660.

Figure 27:
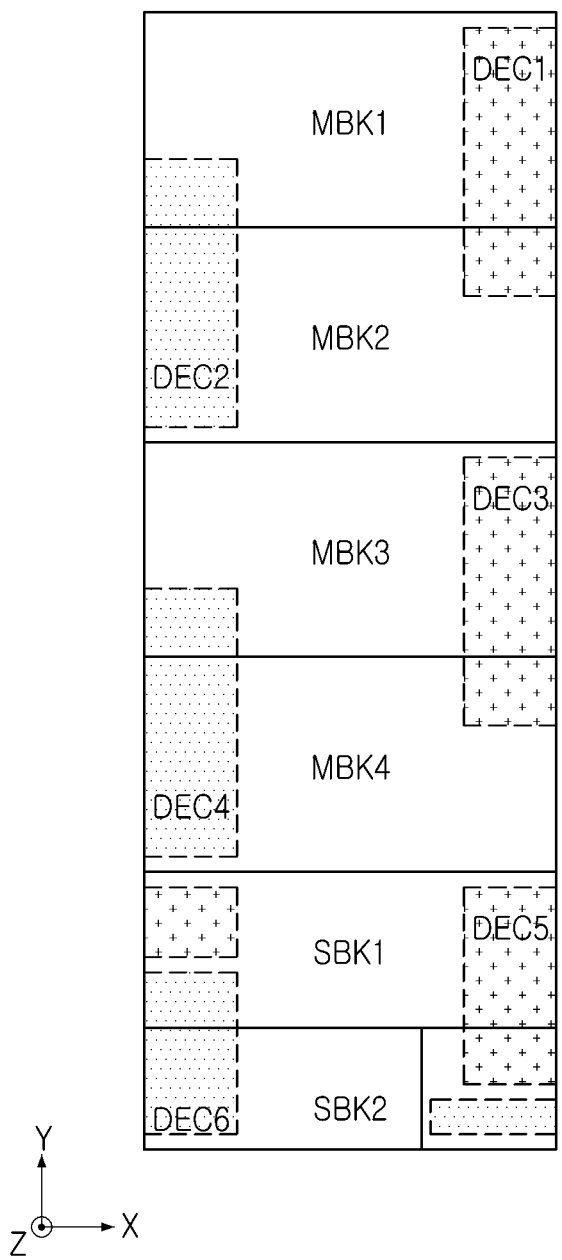
FIG. 27 is a view schematically illustrating a configuration of a plane included in a memory device according to an embodiment of the present inventive concept.

FIG. 27 is a view schematically illustrating a configuration of a plane included in a memory device according to an embodiment of the present inventive concept.

FIG. 27 is a plan view schematically illustrating a plane including spare blocks SBK1 and SBK2 in a memory device 800. The memory device 800 may have a COP structure in which a cell region is disposed on a peripheral circuit region in the first direction (the Z-axis direction). A plurality of blocks included in the cell region are disposed in the second direction (the Y-axis direction). Row decoders DEC1 to DEC6 may be disposed below main blocks MBK1 to MBK4 and spare blocks SBK1 and SBK2, included in the cell region.

Referring to FIG. 27, a first spare block SBK1 and a second spare block SBK2 may have different areas. For example, the second spare block SBK2 may have a smaller area than the first spare block SBK1. Therefore, a space for arranging a sixth row decoder DEC6 connected to the second spare block SBK2 may not be sufficiently secured.

In an embodiment of the present inventive concept, when a space for arranging the row decoders DEC5 and DEC6 is not sufficiently secured due to a reduction in area of the spare blocks SBK1 and SBK2, a portion of the cell region may be removed in at least one of the spare blocks SBK1 and SBK2. A portion of the row decoders DEC5 and DEC6, for example, wiring patterns connected to the devices of the row decoders DEC5 and DEC6 may be disposed, in a secured space in which a portion of the cell region is removed.

In the embodiment illustrated in FIG. 27, a portion of the cell region may be removed from the second spare block SBK2, and a portion of the sixth row decoders DEC6 may be disposed in a secured space in which a portion of the cell region is removed. Therefore, a length of the second spare block SBK2 may be shorter than a length of each of the main blocks MBK1 to MBK4, in the third direction (the X-axis direction).

Figure 28:
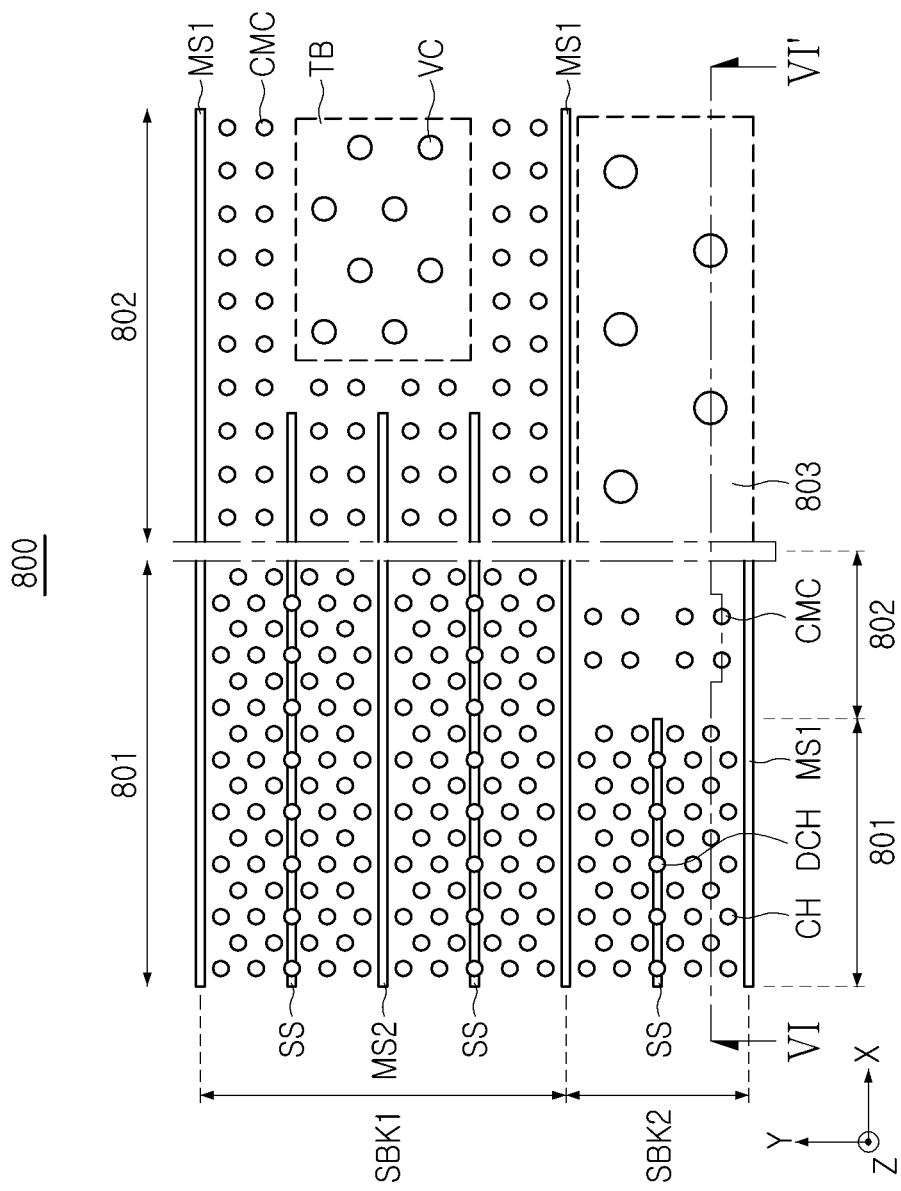
FIGS. 28 and 29 are views schematically illustrating blocks included in a memory device according to an embodiment of the present inventive concept.
Figure 29:
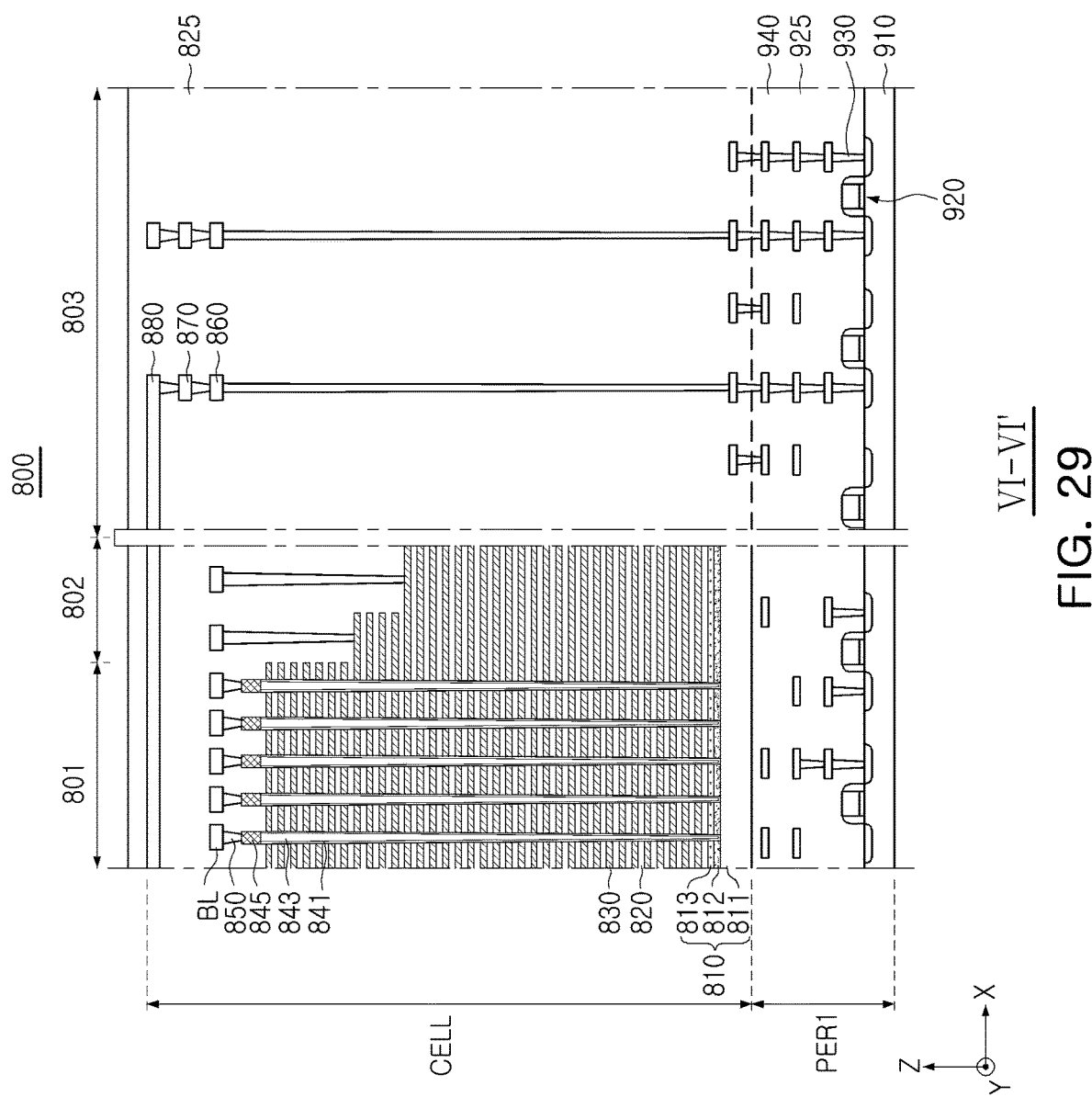

FIGS. 28 and 29 are views schematically illustrating blocks included in a memory device according to an embodiment of the present inventive concept.

FIG. 28 is a plan view schematically illustrating portions of spare blocks SBK1 and SBK2 included in a memory device 800. FIG. 29 is a cross-sectional view illustrating FIG. 28, taken along line VI-VI'. Referring to FIG. 28, a first spare block SBK1 and a second spare block SBK2 may have different areas. The first spare block SBK1 includes a first region 801 that may be a cell array region including channel structures CH, and a second region 802 that may be a pad region including cell contacts CMC. A first region 801 of the second spare block SBK2 may have a relatively small area, as compared to the first spare block SBK1, and a third region 803 may be formed in a space of the second spare block SBK2 secured in which the first region 801 of the second spare block SBK2 is formed to have a relatively small area.

The second spare block SBK2 may have a smaller area, as compared to respective main blocks MBK1 to MBK4 as well as the first spare block SBK1. Therefore, in the embodiment illustrated in FIGS. 28 and 29, since the first region 801 is formed to have a relatively small area in the second spare block SBK2, a second region 802 of the second spare block SBK2 may overlap the first region 801 of the first spare block SBK1 in the second direction (the Y-axis direction). The third region 803 of the second spare block SBK2 may be used as a space for arranging a sixth row decoder DEC6. For example, at least a portion of devices and wiring patterns included in the sixth row decoder DEC6 may be disposed below the third region 803.

Referring to FIG. 29, basic configurations of a cell region CELL and a peripheral circuit region PERI may be similar to those described with reference to FIGS. 23 and 26. Portions of devices 920, contacts 930, and wiring patterns 940, included in the sixth row decoder DEC6, may be disposed below the third region 803 secured by forming the first region 801 having a relatively small area in the second spare block SBK2.

The devices 920 disposed below the third region 803 may be connected to vertical contacts VC and upper wiring patterns 860, 870, and 880. At least one of the upper wiring patterns 860, 870, and 880 may extend in the third direction, to be connected to at least one device of the sixth row decoder DEC6 disposed on a left side of the first region 801 in the third direction. For example, devices of the sixth row decoder DEC6 distributed on both sides of the first region 801 may be connected to each other by the upper wiring patterns 860, 870, and 880.

Referring to FIG. 29, as well as gate electrode layers 830 and channel structures CH, a first substrate 810 may not be disposed in the third region 803. Therefore, the vertical contacts VC may be electrically separated from the first substrate 810, and may extend in the first direction to be connected to the upper wiring patterns 860, 870, and 880 and the wiring patterns 940. At least one of the wiring patterns 940 may be disposed on a level equal to or higher than the first substrate 810 in the first direction.

In order to secure the third region 803, the gate electrode layers 830 and the insulating layers 820 of the second spare block SBK2 may have a relatively shorter length, as compared to gate electrode layers 830 and insulating layers 820 of the other blocks MBK1 to MBK4 and SBK1, in the third direction (the X-axis direction). For example, in a process of forming the pad region 802 connected to the cell contacts CMC, lengths of the gate electrode layers 830 and the insulating layers 820 of the second spare block SBK2 may be adjusted, or the gate electrode layers 830 and the insulating layers 820 may be formed to have relatively short lengths, from a process of stacking the first substrate 810.

Figure 30:
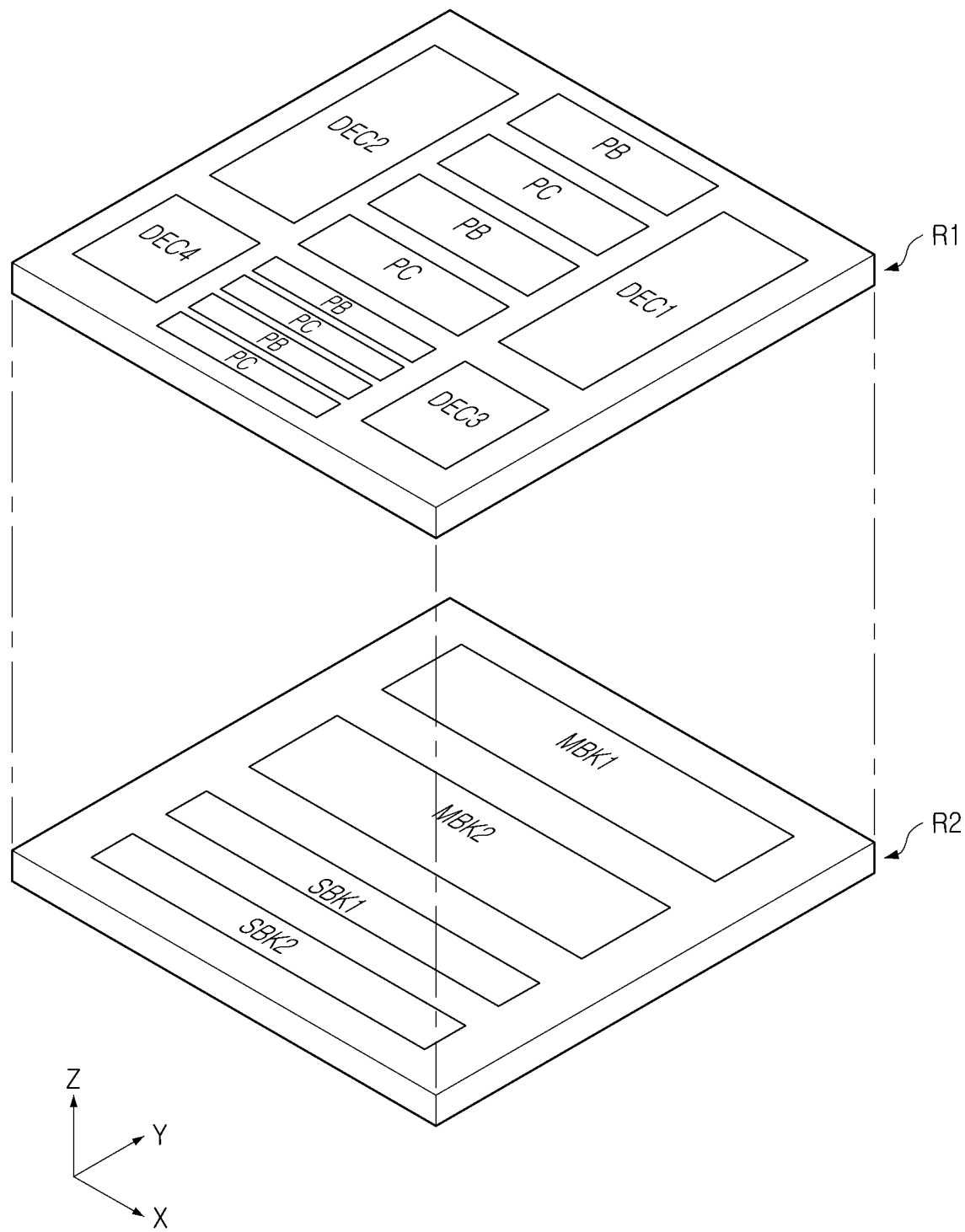
FIG. 30 is a perspective view schematically illustrating a structure of a memory device according to an embodiment of the present inventive concept.
Figure 31:
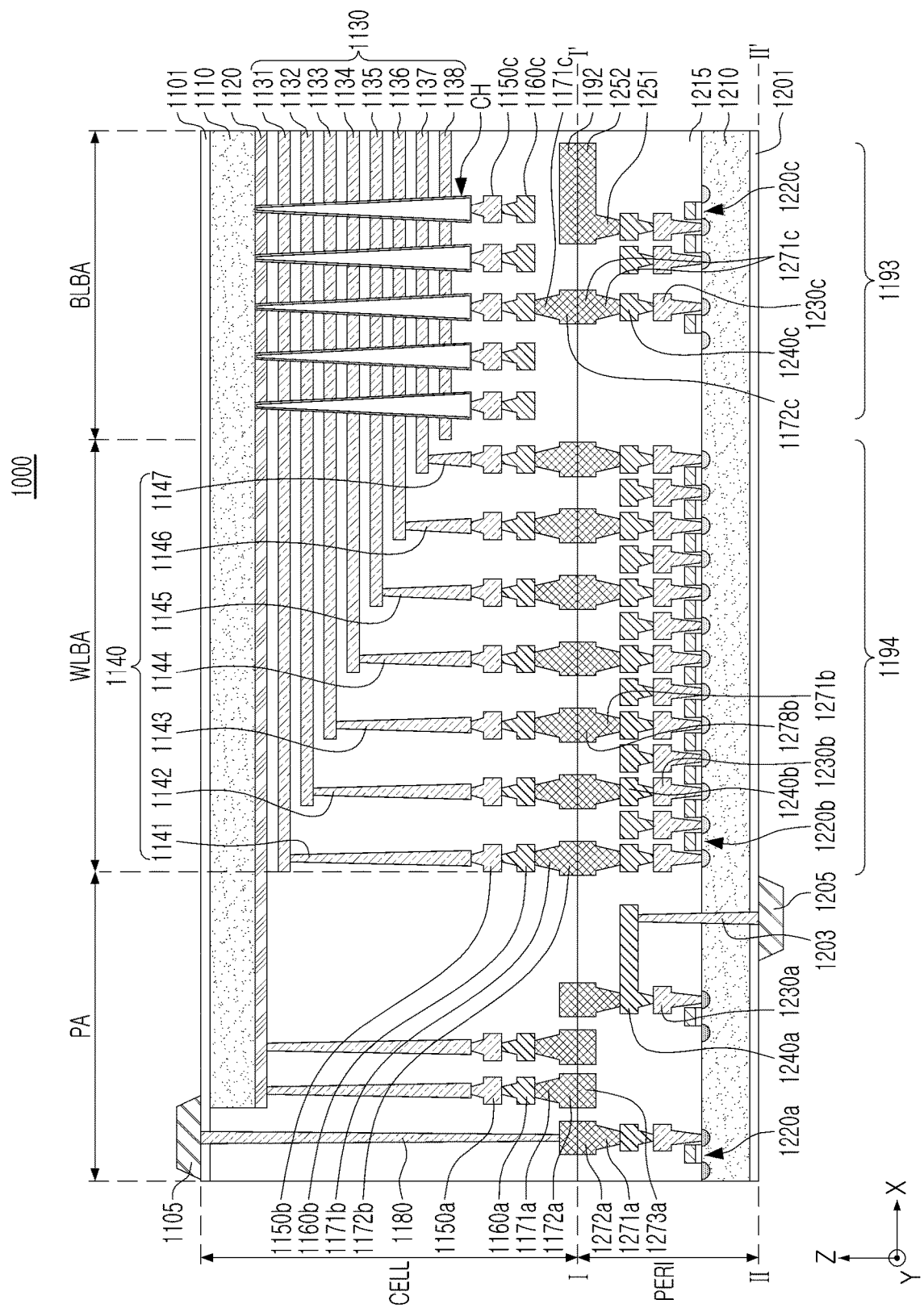
FIG. 31 is a view schematically illustrating a memory device according to an embodiment of the present inventive concept.

FIG. 30 is a perspective view schematically illustrating a structure of a memory device according to an embodiment of the present inventive concept. FIG. 31 is a view schematically illustrating a memory device according to an embodiment of the present inventive concept.

In an embodiment described with reference to FIGS. 30 and 31, a memory device may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other by a bonding process. For example, the bonding process may refer to a method of electrically and physically connecting a bonding metal formed on an uppermost metal layer of the upper chip to a bonding metal formed on an uppermost metal layer of the lower chip. For example, when the bonding metal is formed of copper (Cu), the bonding method may be a Cu—Cu bonding method, and the bonding metal may also be formed of aluminum or tungsten.

Referring to FIG. 30, a peripheral circuit region including row decoders DEC1 to DEC4, page buffers PB, and other peripheral circuits PC may be formed in a first layer R1 in an upper portion of a memory device, and a cell region including a plurality of blocks may be formed in a second layer R2 in a lower portion of the memory device. Unlike the embodiment described above with reference to FIG. 19, which generally describes R1 and R2 comprising two different layers, in the embodiment illustrated in FIG. 30, the first layer R1 and the second layer R2 may be formed on different wafers, respectively. Therefore, as illustrated in FIG. 31, gate electrode layers 1130 and channel structures CH of a cell region CELL, and circuit devices 1220a, 1220b, and 1220c of a peripheral circuit region PERI may be arranged between a first substrate 810 and a second substrate 910 in the first direction (the Z-axis direction).

Similar to the other embodiments described above, spare blocks SBK1 and SBK2 may have a smaller area than main blocks MBK1 and MBK2. As described above, data used or required for operation of a memory device 1000 may be stored only in a portion of active memory cells, among memory cells included in each of the spare blocks SBK1 and SBK2. Therefore, even when an area of each of the spare blocks SBK1 and SBK2 is formed to be smaller than an area of each of the main blocks MBK1 and MBK2, a capacitance required for storing data may be secured. In addition, the areas of the spare blocks SBK1 and SBK2 may be reduced to further form the main blocks MBK1 and MBK2 in the additionally secured space, to improve a degree of integration of the memory device 1000.

Referring to FIG. 31, each of the peripheral circuit region PERI and the cell region CELL of the memory device 1000 may include an external pad bonding area PA, a word line bonding area WLBA, and a bit line bonding area BLBA.

The peripheral circuit region PERI may include a first substrate 1210, an interlayer insulating layer 1215, a plurality of circuit elements 1220a, 1220b, and 1220c formed on the first substrate 1210, first metal layers 1230a, 1230b, and 1230c respectively connected to the plurality of circuit elements 1220a, 1220b, and 1220c, and second metal layers 1240a, 1240b, and 1240c formed on the first metal layers 1230a, 1230b, and 1230c. In an embodiment, the first metal layers 1230a, 1230b, and 1230c may be formed of tungsten having relatively high electrical resistivity, and the second metal layers 1240a, 1240b, and 1240c may be formed of copper having relatively low electrical resistivity.

In the specification, although only the first metal layers 1230a, 1230b, and 1230c and the second metal layers 1240a, 1240b, and 1240c are illustrated and described, the embodiments are not limited thereto, and one or more additional metal layers may be further formed on the second metal layers 1240a, 1240b, and 1240c. At least a portion of the one or more additional metal layers formed on the second metal layers 1240a, 1240b, and 1240c may be formed of aluminum or the like having a lower electrical resistivity than those of copper forming the second metal layers 1240a, 1240b, and 1240c.

The interlayer insulating layer 1215 may be disposed on the first substrate 1210 and cover the plurality of circuit elements 1220a, 1220b, and 1220c, the first metal layers 1230a, 1230b, and 1230c, and the second metal layers 1240a, 1240b, and 1240c. The interlayer insulating layer 1215 may include an insulating material such as silicon oxide, silicon nitride, or the like.

Lower bonding metals 1271b and 1272b may be formed on the second metal layer 1240b in the word line bonding area WLBA. In the word line bonding area WLBA, the lower bonding metals 1271b and 1272b in the peripheral circuit region PERI may be electrically bonded to upper bonding metals 1171b and 1172b of the cell region CELL. The lower bonding metals 1271b and 1272b and the upper bonding metals 1171b and 1172b may be formed of aluminum, copper, tungsten, or the like.

The cell region CELL may include at least one memory block. The cell region CELL may include a second substrate 1110 and a common source line 1120. On the second substrate 1110, a plurality of word lines 1131 to 1138 (i.e., 1130) may be stacked in a direction (the Z-axis direction), perpendicular to an upper surface of the second substrate 1110. At least one string select line and at least one ground select line may be arranged on and below the plurality of word lines 1130, respectively, and the plurality of word lines 1130 may be disposed between the at least one string select line and the at least one ground select line.

In the bit line bonding area BLBA, a channel structure CH may extend in a direction (the Z-axis direction), perpendicular to the upper surface of the second substrate 1110, and pass through the plurality of word lines 1130, the at least one string select line, and the at least one ground select line. The channel structure CH may include a data storage layer, a channel layer, a buried insulating layer, and the like, and the channel layer may be electrically connected to a first metal layer 1150c and a second metal layer 1160c. For example, the first metal layer 1150c may be a bit line contact, and the second metal layer 1160c may be a bit line. In an embodiment, the bit line 1160c may extend in the first direction (the Y-axis direction), parallel to the upper surface of the second substrate 1110.

In the embodiment illustrated in FIG. 31, an area in which the channel structure CH, the bit line 1160c, and the like are disposed may be defined as the bit line bonding area BLBA. In the bit line bonding area BLBA, the bit line 1160c may be electrically connected to the circuit elements 1220c providing a page buffer 1193 in the peripheral circuit region PERI. The bit line 1160c may be connected to upper bonding metals 1171c and 1172c in the cell region CELL, and the upper bonding metals 1171c and 1172c may be connected to lower bonding metals 1271c and 1272c connected to the circuit elements 1220c of the page buffer 1193.

In the word line bonding area WLBA, the word lines 1130 may extend in a second direction (an X-axis direction), parallel to the upper surface of the second substrate 1110 and perpendicular to the first direction, and may be connected to a plurality of cell contact plugs 1141 to 1147 (i.e., 1140). The plurality of word lines 1130 and the plurality of cell contact plugs 1140 may be connected to each other in pads provided by at least a portion of the plurality of word lines 1130 extending in different lengths in the second direction. A first metal layer 1150b and a second metal layer 1160b may be connected to an upper portion of the plurality of cell contact plugs 1140 connected to the plurality of word lines 1130, sequentially. The plurality of cell contact plugs 1140 may be connected to the peripheral circuit region PERI by the upper bonding metals 1171b and 1172b of the cell region CELL and the lower bonding metals 1271b and 1272b of the peripheral circuit region PERI in the word line bonding area WLBA.

The plurality of cell contact plugs 1140 may be electrically connected to the circuit elements 1220b forming a row decoder 1194 in the peripheral circuit region PERI. In an embodiment, operating voltages of the circuit elements 1220b of the row decoder 1194 may be different than operating voltages of the circuit elements 1220c forming the page buffer 1193. For example, operating voltages of the circuit elements 1220c forming the page buffer 1193 may be greater than operating voltages of the circuit elements 1220b forming the row decoder 1194.

A common source line contact plug 1180 may be disposed in the external pad bonding area PA. The common source line contact plug 1180 may be formed of a conductive material such as a metal, a metal compound, polysilicon, or the like, and may be electrically connected to the common source line 1120. A first metal layer 1150a and a second metal layer 1160a may be stacked on an upper portion of the common source line contact plug 1180, sequentially. For example, an area in which the common source line contact plug 1180, the first metal layer 1150a, and the second metal layer 1160a are disposed may be defined as the external pad bonding area PA.

Input/output pads 1205 and 1105 may be disposed in the external pad bonding area PA. Referring to FIG. 31, a lower insulating film 1201 covering a lower surface of the first substrate 1210 may be formed below the first substrate 1210, and a first input/output pad 1205 may be formed on the lower insulating film 1201. The first input/output pad 1205 may be connected to at least one of the plurality of circuit elements 1220a, 1220b, and 1220c disposed in the peripheral circuit region PERI through a first input/output contact plug 1203, and may be separated from the first substrate 1210 by the lower insulating film 1201. In addition, a side insulating film may be disposed between the first input/output contact plug 1203 and the first substrate 1210 to electrically separate the first input/output contact plug 1203 and the first substrate 1210.

Referring to FIG. 31, an upper insulating film 1101 covering the upper surface of the second substrate 1110 may be formed on the second substrate 1110, and a second input/output pad 1105 may be disposed on the upper insulating layer 1101. The second input/output pad 1105 may be connected to at least one of the plurality of circuit elements 1220*a*, 1220*b*, and 1220*c* disposed in the peripheral circuit region PERI through a second input/output contact plug 1103.

According to some embodiments, the second substrate 1110 and the common source line 1120 may not be disposed in an area in which the second input/output contact plug 1103 is disposed. Also, the second input/output pad 1105 may not overlap the word lines 1130 in the third direction (the Z-axis direction). Referring to FIG. 25, the second input/output contact plug 303 may be separated from the second substrate 1110 in a direction, parallel to the upper surface of the second substrate 1110, and may pass through the interlayer insulating layer 1115 of the cell region CELL to be connected to the second input/output pad 1105.

According to embodiments, the first input/output pad 1205 and the second input/output pad 1105 may be selectively formed. For example, the memory device 1000 may include only the first input/output pad 1205 disposed on the first substrate 1110 or the second input/output pad 1105 disposed on the second substrate 1110. Alternatively, the memory device 1000 may include both the first input/output pad 1205 and the second input/output pad 1105.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 1000 may include a lower metal pattern 1273*a*, corresponding to an upper metal pattern 1172*a* formed in an uppermost metal layer of the cell region CELL, and having the same cross-sectional shape as the upper metal pattern 1172*a* of the cell region CELL so as to be connected to each other, in an uppermost metal layer of the peripheral circuit region PERI. In the peripheral circuit region PERI, the lower metal pattern 1273*a* formed in the uppermost metal layer of the peripheral circuit region PERI may not be connected to a contact. Similarly, in the external pad bonding area PA, an upper metal pattern 1172*a*, corresponding to the lower metal pattern 1273*a* formed in an uppermost metal layer of the peripheral circuit region PERI, and having the same shape as the lower metal pattern 1273*a* of the peripheral circuit region PERI, may be formed in an uppermost metal layer of the cell region CELL.

The lower bonding metals 1271*b* and 1272*b* may be formed on the second metal layer 1140*b* in the word line bonding area WLBA. In the word line bonding area WLBA, the lower bonding metals 1271*b* and 1272*b* of the peripheral circuit region PERI may be electrically connected to the upper bonding metals 1171*b* and 1172*b* of the cell region CELL by a bonding.

Further, in the bit line bonding area BLBA, an upper metal pattern 1192, corresponding to a lower metal pattern 1252 formed in the uppermost metal layer of the peripheral circuit region PERI, and having the same cross-sectional shape as the lower metal pattern 1252 of the peripheral circuit region PERI, may be formed in an uppermost metal layer of the cell region CELL. A contact may not be formed on the upper metal pattern 1192 formed in the uppermost metal layer of the cell region CELL.

Figure 32:
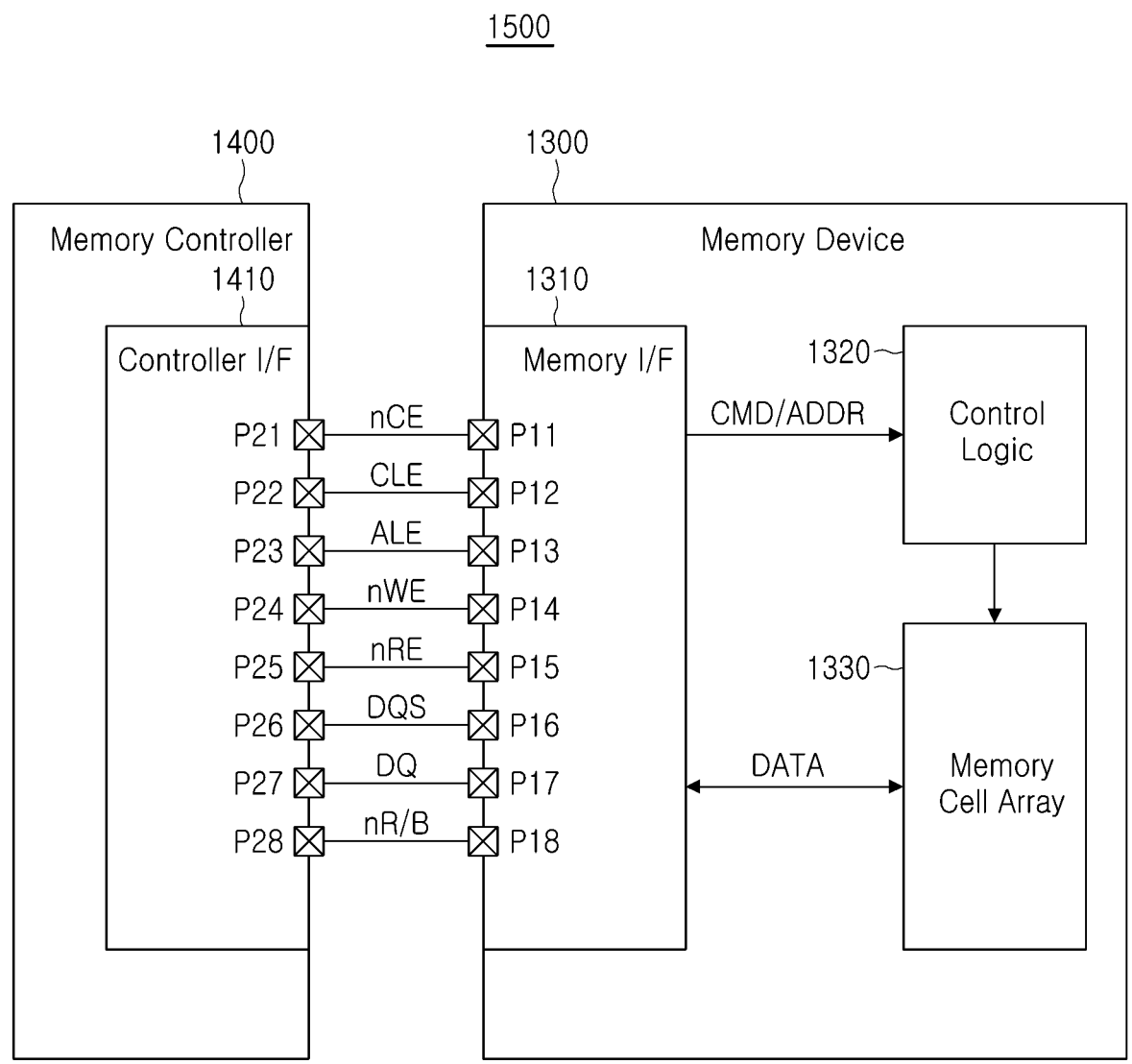
FIG. 32 is a block diagram schematically illustrating a memory system including a memory device according to an embodiment of the present inventive concept.

FIG. 32 is a block diagram schematically illustrating a memory system including a memory device according to an embodiment of the present inventive concept.

FIG. 32 may be a block diagram illustrating a memory system according to an embodiment of the present inventive concept. Referring to FIG. 32, a memory system 1500 may include a memory device 1300 and a memory controller 1400. The memory device 1300 may be a device according to at least one of the embodiments described with reference to FIGS. 1 to 31. The memory controller 1400 may control the memory device 1300, and data used or necessary for the memory controller 1400 to control the memory device 1300 may be stored in a spare block of the memory device 1300.

The memory device 1300 may include first to eighth pins P11 to P18 (also described as external connection terminals), a memory interface circuit 1310, a control logic circuit 1320, and a memory cell array 1330.

The memory interface circuit 1310 may receive a chip enable signal nCE from the memory controller 1400 through the first pin P11. The memory interface circuit 1310 may transmit and receive signals to and from the memory controller 1400 through the second to eighth pins P12 to P18 according to the chip enable signal nCE. For example, when the chip enable signal nCE is in an enable state (e.g., a low level), the memory interface circuit 1310 may transmit and receive signals to and from the memory controller 1400 through the second to eighth pins P12 to P18.

The memory interface circuit 1310 may receive a command latch enable signal CLE, an address latch enable signal ALE, and a write enable signal nWE from the memory controller 1400 through the second to fourth pins P12 to P14. The memory interface circuit 1310 may receive a data signal DQ from the memory controller 1400 through the seventh pin P17 or transmit the data signal DQ to the memory controller 1400. A command CMD, an address ADDR, and data DATA may be transmitted via the data signal DQ. For example, the data signal DQ may be transmitted through a plurality of data signal lines. In this case, the seventh pin P17 may include a plurality of pins respectively corresponding to a plurality of data signals DQ.

The memory interface circuit 1310 may obtain the command CMD from the data signal DQ, which is received in an enable section (e.g., a high-level state) of the command latch enable signal CLE based on toggle time points of the write enable signal nWE. The memory interface circuit 1310 may obtain the address ADDR from the data signal DQ, which is received in an enable section (e.g., a high-level state) of the address latch enable signal ALE based on the toggle time points of the write enable signal nWE.

In an embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuit 1310 may obtain the command CMD or the address ADDR based on toggle time points of the write enable signal nWE.

The memory interface circuit 1310 may receive a read enable signal nRE from the memory controller 1400 through the fifth pin P15. The memory interface circuit 1310 may receive a data strobe signal DQS from the memory controller 1400 through the sixth pin P16 or transmit the data strobe signal DQS to the memory controller 1400.

In a data (DATA) output operation of the memory device 1300, the memory interface circuit 1310 may receive the read enable signal nRE, which toggles through the fifth pin P15, before outputting the data DATA. The memory interface circuit 1310 may generate the data strobe signal DQS, which toggles based on the toggling of the read enable signal nRE. For example, the memory interface circuit 1310 may generate a data strobe signal DQS, which starts toggling after a predetermined delay (e.g., tDQSRE), based on a toggling start time of the read enable signal nRE. The memory interface circuit 1310 may transmit the data signal DQ including the data DATA based on a toggle time point of the data strobe signal DQS. Thus, the data DATA may be aligned with the toggle time point of the data strobe signal DQS and transmitted to the memory controller 1400.

In a data (DATA) input operation of the memory device 1300, when the data signal DQ including the data DATA is received from the memory controller 1400, the memory interface circuit 1310 may receive the data strobe signal DQS, which toggles, along with the data DATA from the memory controller 1400. The memory interface circuit 1310 may obtain the data DATA from the data signal DQ based on toggle time points of the data strobe signal DQS. For example, the memory interface circuit 1310 may sample the data signal DQ at rising and falling edges of the data strobe signal DQS and obtain the data DATA.

The memory interface circuit 1310 may transmit a ready/busy output signal nR/B to the memory controller 1400 through the eighth pin P18. The memory interface circuit 1310 may transmit state information of the memory device 1300 through the ready/busy output signal nR/B to the memory controller 1400. When the memory device 1300 is in a busy state (i.e., when operations are being performed in the memory device 1300), the memory interface circuit 1310 may transmit a ready/busy output signal nR/B indicating the busy state to the memory controller 1400. When the memory device 1300 is in a ready state (i.e., when operations are not performed or completed in the memory device 1300), the memory interface circuit 1310 may transmit a ready/busy output signal nR/B indicating the ready state to the memory controller 1400. For example, while the memory device 1300 is reading data DATA from the memory cell array 1330 in response to a page read command, the memory interface circuit 1310 may transmit a ready/busy output signal nR/B indicating a busy state (e.g., a low level) to the memory controller 1400. For example, while the memory device 1300 is programming data DATA to the memory cell array 1330 in response to a program command, the memory interface circuit 1310 may transmit a ready/busy output signal nR/B indicating the busy state to the memory controller 1400.

The control logic circuit 1320 may control all operations of the memory device 1300. The control logic circuit 1320 may receive the command/address CMD/ADDR obtained from the memory interface circuit 1310. The control logic circuit 1320 may generate control signals for controlling other components of the memory device 1300 in response to the received command/address CMD/ADDR. For example, the control logic circuit 1320 may generate various control signals for programming data DATA to the memory cell array 1330 or reading the data DATA from the memory cell array 1330.

The memory cell array 1330 may store the data DATA obtained from the memory interface circuit 1310, via the control of the control logic circuit 1320. The memory cell array 1330 may output the stored data DATA to the memory interface circuit 1310 via the control of the control logic circuit 1320.

The memory cell array 1330 may include a plurality of memory cells. For example, the plurality of memory cells may be flash memory cells. However, the inventive concept is not limited thereto, and the memory cell may be a resistive random access memory (RRAM) cell, a ferroelectric random access memory (FRAM) cell, a phase change random access memory (PRAM) cell, a thyristor random access memory (TRAM) cell, or a magnetic random access memory (MRAM) cell. Hereinafter, embodiments of the present inventive concept will be described focusing on an embodiment in which the memory cells are NAND flash memory cells. For example, the memory device 1300 may be a device according to at least one of the embodiments described with reference to FIGS. 1 to 31.

The memory controller 1400 may include first to eighth pins P21 to P28 and a controller interface circuit 1410. The first to eighth pins P21 to P28 may respectively correspond to the first to eighth pins P11 to P18 of the memory device 1300.

The controller interface circuit 1410 may transmit the chip enable signal nCE to the memory device 1300 through the first pin P21. The controller interface circuit 1410 may transmit and receive signals to and from the memory device 1300, which is selected by the chip enable signal nCE, through the second to eighth pins P22 to P28.

The controller interface circuit 1410 may transmit the command latch enable signal CLE, the address latch enable signal ALE, and the write enable signal nWE to the memory device 1300 through the second to fourth pins P22 to P24. The controller interface circuit 1410 may transmit or receive the data signal DQ to and from the memory device 1300 through the seventh pin P27.

The controller interface circuit 1410 may transmit the data signal DQ including the command CMD or the address ADDR to the memory device 1300 along with the write enable signal nWE, which toggles. The controller interface circuit 1410 may transmit the data signal DQ including the command CMD to the memory device 1300 by transmitting a command latch enable signal CLE having an enable state. Also, the controller interface circuit 1410 may transmit the data signal DQ including the address ADDR to the memory device 1300 by transmitting an address latch enable signal ALE having an enable state.

The controller interface circuit 1410 may transmit the read enable signal nRE to the memory device 1300 through the fifth pin P25. The controller interface circuit 1410 may transmit or receive the data strobe signal DQS from or to the memory device 1300 through the sixth pin P26.

In a data (DATA) output operation of the memory device 1300, the controller interface circuit 1410 may generate a read enable signal nRE, which toggles, and transmit the read enable signal nRE to the memory device 1300. For example, before outputting data DATA, the controller interface circuit 1410 may generate a read enable signal nRE, which is changed from a static state (e.g., a high level or a low level) to a toggling state. Thus, the memory device 1300 may generate a data strobe signal DQS, which toggles, based on the read enable signal nRE. The controller interface circuit 1410 may receive the data signal DQ including the data DATA along with the data strobe signal DQS, which toggles, from the memory device 1300. The controller interface circuit 1410 may obtain the data DATA from the data signal DQ based on a toggle time point of the data strobe signal DQS.

In a data (DATA) input operation of the memory device 1300, the controller interface circuit 1410 may generate a data strobe signal DQS, which toggles. For example, before transmitting data DATA, the controller interface circuit 1410 may generate a data strobe signal DQS, which is changed from a static state (e.g., a high level or a low level) to a toggling state. The controller interface circuit 1410 may transmit the data signal DQ including the data DATA to the memory device 1300 based on toggle time points of the data strobe signal DQS.

The controller interface circuit 1410 may receive a ready/busy output signal nR/B from the memory device 1300 through the eighth pin P28. The controller interface circuit 1410 may determine state information of the memory device 1300 based on the ready/busy output signal nR/B.

According to an embodiment of the present inventive concept, a spare block storing data used or necessary for an operation of a memory device may have a smaller area than a main block. Therefore, an area occupied by the spare block may be reduced, the main block may be arranged in more numbers, and a degree of integration of the memory device may be improved.

Various advantages and effects of the present inventive concept are not limited to the above-described contents, and can be more easily understood in the course of describing specific embodiments of the present inventive concept.

While example embodiments have been illustrated and described above, it will be apparent to those skilled in the art that modifications and variations could be made without departing from the scope of the present invention as defined by the appended claims.

Terms such as "same," "equal," "planar," or "coplanar," as used herein encompass identicality or near identicality including variations that may occur, for example, due to manufacturing processes. The term "substantially" may be used herein to emphasize this meaning, unless the context or other statements indicate otherwise.

What is claimed is:

1. A memory device comprising:
a cell region in which memory blocks are disposed, each of the memory blocks including gate electrode layers and insulating layers, alternately stacked on a substrate, and channel structures extending in a first direction perpendicular to an upper surface of the substrate and passing through the gate electrode layers and the insulating layers to be connected to the substrate, the first direction being a vertical direction; and
a peripheral circuit region including a row decoder connected to the gate electrode layers and a page buffer connected to the channel structures,
wherein the memory blocks include main blocks and at least a first spare block,
wherein the gate electrode layers extend in a third direction parallel to the upper surface of the substrate, the third direction being a horizontal direction perpendicular to a second direction that is also a horizontal direction, and wherein along a horizontal plane, the gate electrode layers extend longer in the third direction than in the second direction,
wherein a length of the first spare block is shorter than a length of each of the main blocks, in the second direction.

2. The memory device of claim 1, wherein at least some of the gate electrode layers comprise string selection lines, such that at least one string selection line is included in each of the memory blocks,
wherein, along the second direction, the number of the string selection lines included in each of the main blocks is greater than the number of the string selection lines included in the first spare block.

3. The memory device of claim 1, wherein the main blocks and the first spare block are disposed in a single plane.

4. The memory device of claim 1, wherein the row decoder is one of a plurality of row decoders, each connected to a respective memory block, and an area of a region occupied by each row decoder connected to one of the main blocks is larger than an area of a region occupied by a row decoder connected to the first spare block.

5. The memory device of claim 1, wherein a length of the first spare block is shorter than a length of each of the main blocks, in the third direction.

6. The memory device of claim 1, wherein the row decoder is one of a plurality of row decoders, each connected to a respective memory block, and each row decoder respectively connected to a corresponding main block is disposed on one side of the corresponding main block in the third direction.

7. The memory device of claim 6, wherein the row decoder connected to the first spare block is disposed on both sides of the first spare block in the third direction.

8. The memory device of claim 7, wherein each row decoder includes pass transistors and wiring patterns connecting the pass transistors and the gate electrode layers,
wherein at least some of the pass transistors and the wiring patterns are distributed on the both sides of the first spare block in the third direction.

9. The memory device of claim 8, wherein at least some of the gate electrode layers included in the first spare block are commonly connected to one of the wiring patterns.

10. The memory device of claim 8, wherein at least some of the gate electrode layers included in the first spare block are commonly connected to one of the pass transistors.

11. The memory device of claim 8, wherein the number of pass transistors included in each row decoder respectively connected to a corresponding main block is greater than the number of pass transistors included in the row decoder connected to the first spare block.

12. The memory device of claim 1, wherein the cell region further comprises bit lines disposed above the gate electrode layers in the first direction, connected to the channel structures, and extending in the second direction.

13. A memory device comprising:
a memory cell array including a plurality of memory cells and divided into a plurality of blocks;
a row decoder connected to the memory cell array through word lines;
a page buffer connected to the memory cell array through bit lines; and
a control logic circuit configured to control the memory cell array through the row decoder and the page buffer,
wherein the memory cell array, the row decoder, and the page buffer are provided in a plurality of planes including a first plane and a second plane,
wherein each of the memory cell array of the first plane and the memory cell array of the second plane includes main blocks and at least a first spare block, respectively,
wherein the number of memory cells included in each spare block is less than the number of memory cells included in each of the main blocks,
wherein the control logic circuit allocates a portion of the memory cells included in each spare block as active memory cells, and allocates remainder of the memory cells included in each spare block as non-active memory cells, and
wherein for each spare block, the control logic circuit writes data to only the active memory cells.

14. The memory device of claim 13, wherein, in each spare block, the number of the active memory cells is less than the number of the non-active memory cells.

15. The memory device of claim 13, wherein the control logic circuit is configured to write two or more bits of data to each of the memory cells included in each of the main blocks, and to write one bit of data to each of the active memory cells in each spare block.

16. The memory device of claim 13, wherein the plurality of planes further include a third plane,
wherein the third plane does not include a spare block.

17. The memory device of claim 13, wherein the control logic circuit stores at least one of bias voltage data required to control the memory cell array, and control data received from an external memory controller, in each spare block.

18. A memory device comprising:
a cell region in which a plurality of memory blocks are disposed, each of the memory blocks including gate electrode layers and insulating layers alternately stacked on a substrate, and channel structures extending in a first direction perpendicular to an upper surface of the substrate, and passing through the gate electrode layers and the insulating layers to be connected to the substrate, the first direction being a vertical direction; and
a peripheral circuit region including a row decoder connected to the gate electrode layers and a page buffer connected to the channel structures,
wherein the gate electrode layers in each of the memory blocks provide at least one ground selection line, a plurality of word lines, and a plurality of string selection lines, wherein the string selection lines are separated from each other in a second, horizontal, direction perpendicular to a first, horizontal, direction in which the string selection lines extend, and
wherein, along the second direction, the number of the string selection lines included in each memory block of a first group of the memory blocks is different from the number of the string selection lines included in each memory block of a second group of the memory blocks.

* * * * *